(12) United States Patent  
Asai et al.

(10) Patent No.: US 8,670,145 B2  
(45) Date of Patent: Mar. 11, 2014

(54) CONTROLLING IMAGE PROCESSING SYSTEM

(71) Applicants: Takahiro Asai, Naka-gun (JP); Tatsumi Ishiwata, Yokohama (JP); Naruhiko Ogasawara, Sakura (JP)

(72) Inventors: Takahiro Asai, Naka-gun (JP); Tatsumi Ishiwata, Yokohama (JP); Naruhiko Ogasawara, Sakura (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/646,652

(22) Filed: Oct. 5, 2012

(65) Prior Publication Data

US 2013/0027747 A1    Jan. 31, 2013

Related U.S. Application Data

(63) Continuation of application No. 12/183,564, filed on Jul. 31, 2008.

(30) Foreign Application Priority Data

Aug. 2, 2007   (JP) .................................. 2007-202385  
Jun. 12, 2008  (JP) .................................. 2008-154521

(51) Int. Cl.  
*G06F 3/12*   (2006.01)

(52) U.S. Cl.  
USPC .......... 358/1.15; 358/1.13; 709/223; 710/104

(58) Field of Classification Search  
USPC ........................................................ 358/1.15  
See application file for complete search history.

(56) References Cited

U.S. PATENT DOCUMENTS

| | | | |
|---|---|---|---|
| 5,619,649 A | 4/1997 | Kovnat et al. | |
| 6,965,958 B1 * | 11/2005 | Sugiyama | 710/104 |
| 7,042,585 B1 | 5/2006 | Whitmarsh et al. | |
| 7,127,451 B1 * | 10/2006 | Kimura | 710/15 |
| 7,830,539 B2 | 11/2010 | Yajima et al. | |
| 2002/0059489 A1 * | 5/2002 | Davis et al. | 710/72 |
| 2002/0063887 A1 * | 5/2002 | White | 358/1.15 |
| 2002/0163665 A1 * | 11/2002 | Iwata et al. | 358/1.15 |
| 2003/0002066 A1 | 1/2003 | Miyano | |
| 2004/0156074 A1 | 8/2004 | Kim | |
| 2005/0052694 A1 | 3/2005 | Asano | |
| 2006/0256372 A1 * | 11/2006 | Suzuki | 358/1.15 |
| 2007/0027990 A1 | 2/2007 | Nakaoka et al. | |
| 2007/0127050 A1 | 6/2007 | Iwata et al. | |

FOREIGN PATENT DOCUMENTS

| | | |
|---|---|---|
| JP | 2003-234866 | 8/2003 |
| JP | 2004-7346 | 1/2004 |
| JP | 2004-234326 | 8/2004 |

(Continued)

OTHER PUBLICATIONS

May 17, 2011 European search report in connection with corresponding European patent application No. 08 25 2613.

(Continued)

*Primary Examiner* — Marivelisse Santiago Cordero  
*Assistant Examiner* — Arron R Gerger  
(74) *Attorney, Agent, or Firm* — Cooper & Dunham LLP

(57) ABSTRACT

In an image processing system, when a user request is received from a client apparatus, an image processing management apparatus determines whether the user request can be processed by the image processing system to generate a determination result, and generate an instruction indicating how the image processing system should operate based on the determination result.

18 Claims, 23 Drawing Sheets

(56) References Cited

FOREIGN PATENT DOCUMENTS

| | | |
|---|---|---|
| JP | 2005-157613 | 6/2005 |
| JP | 2006-229714 | 8/2006 |
| JP | 2007-129522 | 5/2007 |

OTHER PUBLICATIONS

Jun. 5, 2012 communication from the Japanese Patent Office in connection with corresponding Japanese patent application No. 2008-154521.

* cited by examiner

| ID | NAME | ADDRESS | KEY | FORMAT | FUNCTION | STATUS |
|----|------|---------|-----|--------|----------|--------|
| 01 | MFP 1 | *.*.*.* | ××× | aaa, bbb | AAA, BBB | *** |
| 02 | CLIENT 2 | *.*.*.* | ○○○ | — | — | *** |

| ID | NAME | ADDRESS | FORMAT | FUNCTION |
|---|---|---|---|---|
| 01 | SERVER 5a | *.*.*.* | aaa, ccc | EEE, GGG |
| 02 | SERVER 5b | *.*.*.* | bbb, | FFF, HHH |
| 03 | SERVER 5c | *.*.*.* | aaa, ccc, ddd | AAA, CCC, DDD |

CONTROLLING IMAGE PROCESSING SYSTEM

CROSS-REFERENCE TO RELATED APPLICATIONS

This patent application is a Rule 1.53(b) continuation of application Ser. No. 12/183,564, filed Jul. 31, 2008 which is based on and claims priority under 35 U.S.C. §119 to Japanese Patent Application Nos. 2007-202385 filed on Aug. 2, 2007 and 2008-154521 filed on Jun. 12, 2008, in the Japanese Patent Office, the entire contents of each which is hereby incorporated herein by reference.

FIELD OF THE INVENTION

Example embodiments of the present invention generally relate to an apparatus, method, system, computer program and product each capable of controlling an image processing system, and more specifically relate to an apparatus, method, system, computer program and product each capable of controlling an image processing operation to be performed by an image processing system having a plurality of apparatuses connected via a network.

BACKGROUND

Recently, a plurality of image forming apparatuses may be shared by a plurality of client apparatuses through a network. In such case, each client apparatus needs to be provided with a printer driver specific to each one of the plurality of image forming apparatuses on the network. Without the printer driver being installed, the client apparatus is not capable of generating a printing job having a format specific to each image forming apparatus. For this reason, each client apparatus is usually provided with more than one printer driver. Further, the printer driver being installed on the client apparatus needs to be maintained to be the current version, for example, when the firmware of the image forming apparatus is updated due to the addition of a new image forming function.

Further, the printer driver, which is installed on the client apparatus, works on an operating system (OS) of the client apparatus such that the printer driver needs to be designed based on the OS. If the client apparatus is provided with more than one OS, or the OS with different versions, the client apparatus is required to install the printer driver specific to each type or version of the OS. Further, the printer driver being installed on the client apparatus needs to be maintained to be the current version, for example, when the version of the OS is updated.

As described above, management of one or more printer drivers in each client apparatus, which is usually operated by the human, has been cumbersome. In view of these limitations, Japanese Patent Application Publication No. 2004-7346 describes an image forming apparatus capable of providing a plurality of image forming functions, without requiring a computer terminal to install a plurality of drivers. However, the Japanese Patent Application Publication No. 2004-7346 does not describe the case in which the user desires to perform various processing before or after image forming, which is not supported by the image forming apparatus.

SUMMARY

Example embodiments of the present invention include an image processing management apparatus including a registrar, a session manager, and a service manager. The registrar receives device information from a service providing apparatus provided on a network via the network. The device information includes image processing function information regarding an image processing function provided by the service providing apparatus. The session manager receives an image processing request from a first apparatus provided on the network via the network. The image processing request is generated by the first apparatus according to a user instruction for applying image processing to input data to generate output data. The image processing request includes image processing information regarding the image processing to be applied to the input data to generate the output data. The service manager determines whether the service providing apparatus is capable of applying the image processing specified by the image processing information by referring to the image processing function information to generate a first service determination result. When the service determination result indicates that the service providing apparatus is capable of applying the image processing specified by the image processing information, the service manager generates an image processing instruction to cause the service providing apparatus to apply the image processing specified by the image processing information using the image processing function.

Example embodiments of the present invention include an information processing apparatus including a user interface, a session manager, an image processing information manager, and a user interface manager. The user interface interacts with the user. The session manager receives image processing function information from an image processing management apparatus provided on a network via the network. The image processing information manager manages the image processing function information. The user interface manager generates a screen including the image processing function information and causes the user interface to display the screen. The user interface further receives a user instruction from the user for applying image processing to input data to generate output data, which is selected from the image processing function information included in the screen.

Example embodiments of the present invention include an image forming apparatus including a user interface, a session manager, an image processing information manager, and a user interface manager. The user interface interacts with the user. The session manager receives image processing function information from an image processing management apparatus provided on a network via the network. The image processing information manager manages the image processing function information. The user interface manager generates a screen including the image processing function information and causes the user interface to display the screen. The user interface further receives a user instruction from the user for applying image processing to input data to generate output data, which is selected from the image processing function information included in the screen.

Example embodiments of the present invention include an image processing system including a first apparatus, a service providing apparatus, and an image processing management apparatus, each of which is provided on a network. The first apparatus generates an image processing request according to a user instruction for applying image processing to input data to generate output data. The image processing request includes image processing information regarding the image processing to be applied to the input data to generate the output data. The service providing apparatus includes an image processing apparatus capable of providing an image processing function. The image processing management apparatus receives device information from the service providing apparatus via the network, which includes image processing function information regarding the image processing function provided by the image management apparatus of the service providing apparatus. When the image processing request is received from the first apparatus, the image processing management apparatus determines whether the service providing apparatus is capable of applying the image processing specified by the image processing information by referring to the image processing function information to generate a first service determination result, and generates an image processing instruction based on the first service determination result.

Example embodiments of the present invention include an image processing management method including: receiving device information from a service providing apparatus provided on a network via the network, the device information including image processing function information regarding an image processing function provided by the service providing apparatus; receiving an image processing request from a first apparatus provided on the network via the network, the image processing request being generated by the first apparatus according to a user instruction for applying image processing to input data to generate output data, the image processing request including image processing information regarding the image processing to be applied to the input data to generate the output data; determining whether the service providing apparatus is capable of applying the image processing specified by the image processing information by referring to the image processing function information to generate a service determination result; and generating an instruction based on the service determination result.

Example embodiments of the present invention include a storage medium including a plurality of instructions which causes, when executed by a processor, the processor to perform an image processing management method. The image processing management method includes: receiving device information from a service providing apparatus provided on a network via the network, the device information including image processing function information regarding an image processing function provided by the service providing apparatus; receiving an image processing request from a first apparatus provided on the network via the network, the image processing request being generated by the first apparatus according to a user instruction for applying image processing to input data to generate output data, the image processing request including image processing information regarding the image processing to be applied to the input data to generate the output data; determining whether the service providing apparatus is capable of applying the image processing specified by the image processing information by referring to the image processing function information to generate a service determination result; and generating an instruction based on the service determination result.

Example embodiments of the present invention include a storage medium including a plurality of instructions which causes, when executed by a processor, the processor to perform an image processing management method. The image processing management method includes: receiving image processing function information from an image processing management apparatus provided on a network via the network; generating a screen including the image processing function information; displaying the screen to a user; and generating an image processing request according to a user instruction for applying image processing to input data to generate output data, the image processing being selected from image processing function information included in the screen.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
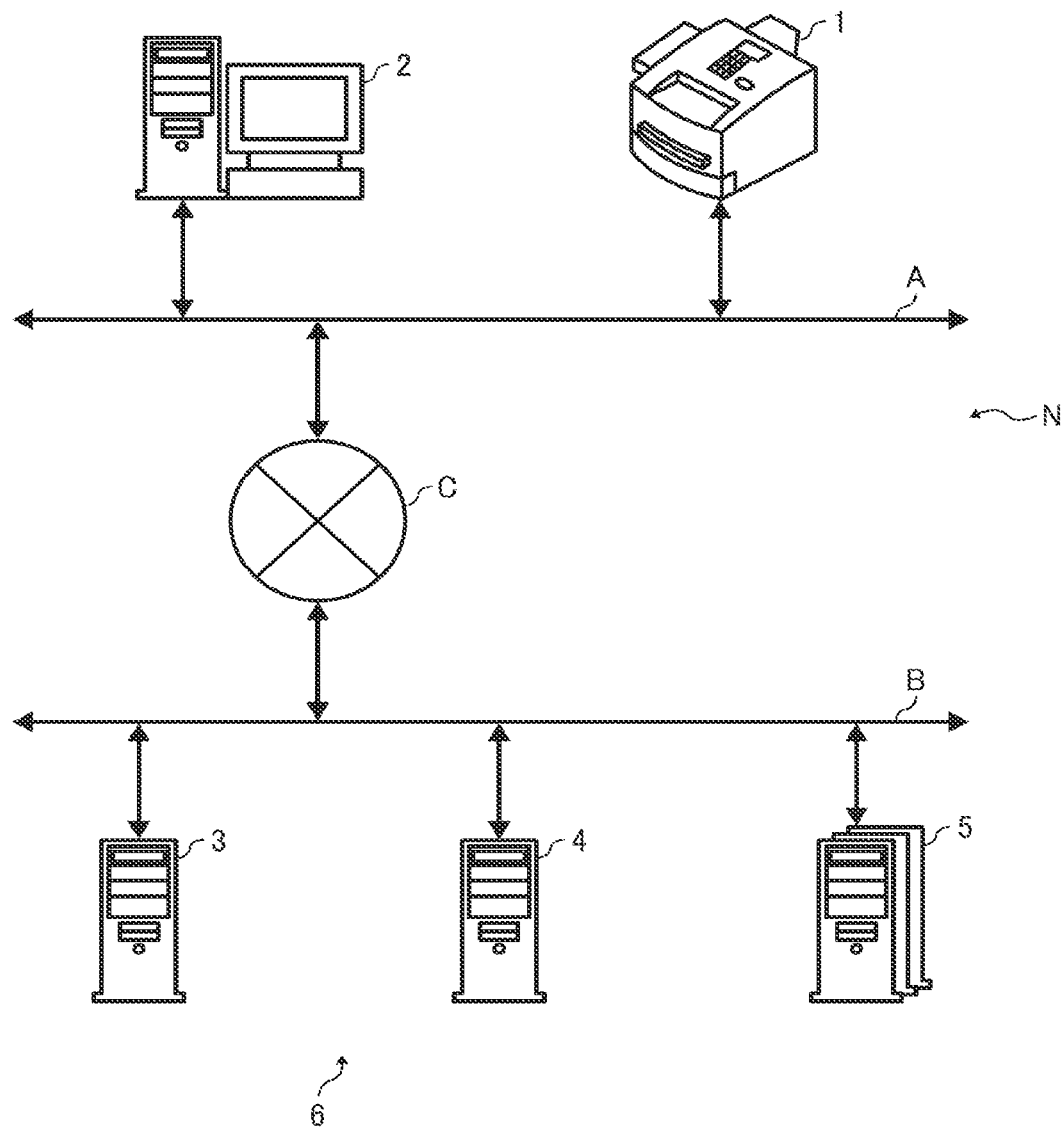
FIG. 1 is an illustration for explaining a configuration of an image processing system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a configuration of an image processing system is explained according to an example embodiment of the present invention. The image processing system of FIG. 1 includes an image forming apparatus 1, an information processing apparatus 2, a session management server 3, a service management server 4, and a service providing server 5. The image forming apparatus 1 and the information processing apparatus 2 are connected to a first network A. The session management server 3, the service management server 4, and the service providing server 5 are connected to a second network B. In this example, the first network A and the second network B may each be implemented by a local area network (LAN), for example. Further, the first network A and the second network B are connected to a third network C, such as the Internet. Further, in this example, it is assumed that the first network A corresponds to a network of a user using the information processing apparatus 2 and the image forming apparatus 1. It is further assumed that the second network B corresponds to a network of a service provider providing the communication service to the user. Further, in this example, at least a portion of the first network A, the second network B, and the third network C may be collectively referred to as the network N.

The image forming apparatus 1 may be implemented by any desired image forming apparatus capable of performing image forming operation including, for example, a printer apparatus, a facsimile apparatus, a scanner apparatus, or a multifunctional apparatus capable of performing a plurality of functions including scanning, faxing, printing, or copying. The image forming apparatus 1 is further provided with the function of communicating via the network N. Further, as described below referring to FIG. 18 or 20, any number of the image forming apparatus 1 may be provided on any location on the network N.

The information processing apparatus 2 may be implemented by any desired apparatus having a processor and a memory, which may be provided with the function of communicating via the network N and the function of interacting with the user. The information processing apparatus 2 may be implemented by, for example, any desired computer, personal digital assistant (PDA) device, mobile phone, car navigation system, digital camera, digital video, etc.

The session management server 3 and the service management server 4, which may be collectively referred to as an image processing management apparatus 6, may together control operation of the image processing system of FIG. 1. For example, the session management server 3 may provide the function of managing communication among a plurality of apparatuses provided on the network N. At least one of the session management server 3 and the service management server 4 may provide any one of a plurality of functions including, for example, the function of managing various information regarding the plurality of apparatuses provided on the network N such as device information obtainable from the plurality of apparatus on the network N, the function of determining how an image processing operation is performed by at least one of the plurality of apparatuses provided on the network N, the function of determining how a data transferring operation is performed by at least one of the plurality of apparatuses provided on the network N, the function of determining how an image forming operation is performed by at least one of the plurality of apparatuses provided on the network N, and the function of determining how a post processing operation is performed by at least one of the plurality of apparatuses provided on the network N. The image processing management apparatus 6 may be implemented by any number of devices, for example, depending on a specific function to be provided. Further, the image processing management apparatus 6 may be implemented by any number of devices each having a processor and a memory.

The service providing server 5, which may be implemented by any number of devices each capable of communicating via the network N, may provide a specific service to any one of the plurality of apparatuses provided on the network N via the network N according to an instruction received from the image processing management apparatus 6. The service providing server 5 may be implemented by any desired apparatus having a processor and a memory, which may be provided with the function of communicating via the network N and the function of providing a function such as an image processing function.

In one example operation, at least one of the image forming apparatus 1 and the information processing apparatus 2, which may be referred to as a client apparatus, may receive a user instruction for applying image processing to input data to generate output data. The input data may be generated or edited by the information processing apparatus 2. Alternatively, the input data may be obtained by the image forming apparatus 1 by scanning an original document. Further, the input data may be stored in any location on the network N, such as in a storage provided in any one of the apparatuses provided on the network N. When the user instruction is received, the client apparatus may generate an image processing request, which includes image processing information regarding image processing to be applied to the input data to generate the output data, and send the image processing request to the image processing management apparatus 6 via the network. When the image processing request is received, the image processing management apparatus 6 may determine whether any one of the apparatuses provided on the network N is capable of applying the image processing specified by the image processing information to generate a service determination result. For example, the image processing management apparatus 6 may receive device information from the apparatuses provided on the network N such as the service providing server 5, and store the device information in a storage provided on the network N. Using the device information, which includes image processing function information indicating an image processing function to be provided by the service providing server 5, for example, the image processing management apparatus 6 may generate the service determination result. When the service determination result indicates that the service providing server 5 is capable of applying the image processing specified by the image processing information, the image processing management apparatus 6 may generate an image processing instruction that causes the service provider server 5 to apply the image processing to the input data to generate the output data. The image processing management apparatus 6 may send the image processing instruction directly to the service providing server 5 or via another apparatus provided on the network N such as the client apparatus.

After applying the image processing specified by the image processing information, the service providing server 5 may store the output data in any storage provided on the network N according to an instruction received from the image processing management apparatus 6. Alternatively, the service providing server 5 may send the output data to which the image processing is applied to any apparatus, such as the image processing management apparatus 6 or the client apparatus, according to an instruction received from the image processing management apparatus 6.

In the above-described example of processing the image processing request, when the service determination result indicating whether the service providing server 5 is capable of applying the image processing specified by the image processing information indicates that there is more than one device of the service providing server 5, the image processing management apparatus 6 may select one of the devices of the service providing server 5, for example, based on the device information of the service providing server 5 such as the address information or the status information.

In the above-described example of processing the image processing request, when the image processing specified by the image processing information includes a plurality of image processing operations, and the service determination result indicates that a plurality of devices of the service providing server 5 applies at least one of the plurality of image processing operations, the image processing management apparatus 6 may further determine an order of applying the plurality of image processing operations to generate a processing order determination result to cause the service providing server 5 to apply the plurality of image processing operations in the order specified by the processing order determination result. For example, the image processing management apparatus 6 may generate route information based on the processing order determination result, which indicates a route of transferring the image data from one device to another device of the service providing server 5. Based on the route information, the image processing management apparatus 6 may generate an instruction, such as an image transfer instruction or an image processing instruction.

In another example operation, at least one of the image forming apparatus 1 and the information processing apparatus 2, which may be referred to as the client apparatus, may receive a user instruction for forming an image of image data. The image data may be generated or edited by the information processing apparatus 2. Alternatively, the image data may be obtained by the image forming apparatus 1 by scanning an original document. Further, the image data may be stored in any location on the network N, such as in a storage provided in any one of the apparatuses provided on the network N. Further, the image data may be processed image data to which image processing is applied by, for example, the service providing server 5. When the user instruction is received, the client apparatus may generate an image forming request, which includes image data information regarding a data format of the image data, and send the image forming request to the image processing management apparatus 6 via the network N. When the image forming request is received, the image processing management apparatus 6 may determine whether the image forming apparatus 1 is capable of interpreting the data format of the image data to generate a service determination result. For example, the image processing management apparatus 6 may receive device information from the image forming apparatus 1, and store the device information in a storage provided on the network N. Using the device information, which includes data format information regarding a data format interpretable by the image forming apparatus 1, for example, the image processing management apparatus 6 may generate the service determination result. When the service determination result indicates that the image forming apparatus 1 is capable of interpreting the data format of the image data, the image processing management apparatus 6 may generate an image forming instruction that causes the image forming apparatus 1 to form an image of the image data. The image processing management apparatus 6 may send the image forming instruction directly to the image forming apparatus 1 or via another apparatus provided on the network N such as the information processing apparatus 2.

In the above-described example of processing the image forming request, information regarding the data format of the image data may be directly obtained from an image data file, for example, when the image data file is being sent to the image processing management apparatus 6 together with the image forming request.

In the above-described example of processing the image forming request, when the service determination result indicates that the image forming apparatus 1 is not capable of interpreting the data format of the image data, the image processing management apparatus 6 may determine whether any one of the apparatuses on the network N, such as the service providing server 5, is capable of applying data conversion to cause the image data to be converted to the data format interpretable by the image forming apparatus 1 to generate a determination result. For example, the image processing management apparatus 6 may receive device information from the service providing server 5, and store the device information in a storage provided on the network N. Using the device information, which includes image processing function information indicating an image processing function to be provided by the service providing server 5, for example, the image processing management 6 may generate the service determination result. When the service determination result indicates that the service providing server 5 is capable of applying the data conversion, the image processing management apparatus 6 may generate a data conversion instruction that causes the service providing server 5 to apply the data conversion to the image data to be in the data format interpretable by the image forming apparatus 1. The image processing management apparatus 6 may send the data conversion instruction directly to the service providing server 5 or via another apparatus provided on the network N such as information processing apparatus 1.

In the above-described example of processing the image forming request, when the service determination result indicating whether the service providing server 5 is capable of applying the data conversion indicates that there is more than one device of the service providing server 5, the image processing management apparatus 6 may select one of the devices of the service providing server 5, for example, based on the device information of the service providing server 5 such as the address information or the status information.

In another example operation, at least one of the image forming apparatus 1 and the information processing apparatus 2, which may be referred to as the client apparatus, may receive a user instruction for applying post processing to a sheet having an image formed thereon. The sheet with the image may be generated by the image forming apparatus 1. When the user instruction is received, the client apparatus may generate a post processing request, which includes post processing information regarding post processing to be applied to the sheet with the image, and send the post processing request to the image processing management apparatus 6 via the network. When the post processing request is received, the image processing management apparatus 6 may determine whether any one of the apparatuses provided on the network N is capable of applying the post processing specified by the post processing information to generate a service determination result. For example, the image processing management apparatus 6 may receive device information from the apparatuses provided on the network N such as the image forming apparatus 1, and store the device information in a storage provided on the network N. Using the device information, which includes post processing function information indicating a post processing function to be provided by the image forming apparatus 1, for example, the image processing management apparatus 6 may generate the service determination result. When the service determination result indicates that the image forming apparatus 1 is capable of applying the post processing specified by the post processing information, the image processing management apparatus 6 may generate a post processing instruction that causes the image forming apparatus 1 to apply the post processing to the sheet with the image. The image processing management apparatus 6 may send the post processing instruction directly to the image forming apparatus 1 or via another apparatus provided on the network N such as the information processing apparatus 2.

In the above-described example of processing the post processing request, when the service determination result indicating whether the image forming apparatus 1 is capable of applying the post processing indicates that there is more than one apparatus of the image forming apparatus 1, the image processing management apparatus 6 may select one of the apparatuses of the image forming apparatus 1, for example, based on the device information of the image forming apparatus 1 such as the address information or the status information.

In the above-described example of processing the post processing request, when the service determination result indicates that the image forming apparatus 1 or any other image forming apparatus provided on the network N is not capable of applying the post processing specified by the post processing information, the image processing management apparatus 6 may send a notice to the client apparatus.

In another example, at least one of the image forming apparatus 1 and the information processing apparatus 2, which may be referred to as the client apparatus, may receive a user instruction to transfer image data from a first apparatus to a second apparatus via the network N. The image data may be generated or edited by the information processing apparatus 2. Alternatively, the image data may be obtained by the image forming apparatus 1 by scanning an original document. Further, the image data may be stored in any location on the network N, such as in a storage provided in any one of the apparatuses provided on the network N. Further, the image data may be processed image data to which image processing is applied by, for example, the service providing server 5. When the user instruction is received, the client apparatus may generate an image transfer request, which includes information regarding the first apparatus and the second apparatus, and send the image transfer request to the image processing management apparatus 6 via the network N. When the image transfer request is received, the image processing management apparatus 6 may determine whether the first apparatus and the second apparatus are each capable of communicating to generate a service determination result. For example, the image processing management apparatus 6 may receive device information from the first apparatus and the second apparatus, and store the device information in a storage provided on the network N. Using the device information, which includes status information regarding a current status of the first apparatus and the second apparatus, for example, the image processing management apparatus 6 may generate the service determination result. When the service determination result indicates that the first apparatus and the second apparatus are capable of communicating, the image processing management apparatus 6 may generate a session start instruction that causes the first apparatus and the second apparatus to establish a session. The image processing management apparatus 6 may send the session start instruction to at least one of the first apparatus and the second apparatus, or via another apparatus provided on the network N such as the information processing apparatus 2. After the session is established, the image data may be transferred from the first apparatus to the second apparatus.

In the above-described example of processing the image transfer request, alternatively, the image processing management apparatus 6 may establish a session respectively with the first apparatus and the second apparatus. In such case, the image data may be transferred from the first apparatus to the second apparatus via the image processing management apparatus 6.

The image processing system of FIG. 1 may be implemented in various other ways. For example, the service providing server 5 may be integrated within the image processing management apparatus 6. In another example, any number of devices of the service providing server 5 may be provided on the first network A as illustrated in FIG. 1. In another example, any number of devices of the image processing management apparatus 6 may be provided on the first network A. In another example, the image forming apparatus 1 may be provided on the second network B. In another example, the image processing management apparatus 6 and at least one of the image forming apparatus 1, the information processing apparatus 2, and the service providing server 5 may be provided on the network N. In another example, any one of the information processing apparatus 2, the image forming apparatus 1, and the service providing server 5 may collectively referred to as a service providing apparatus based on the function to provide a specific service to the image processing system of FIG. 1.

Figure 2:
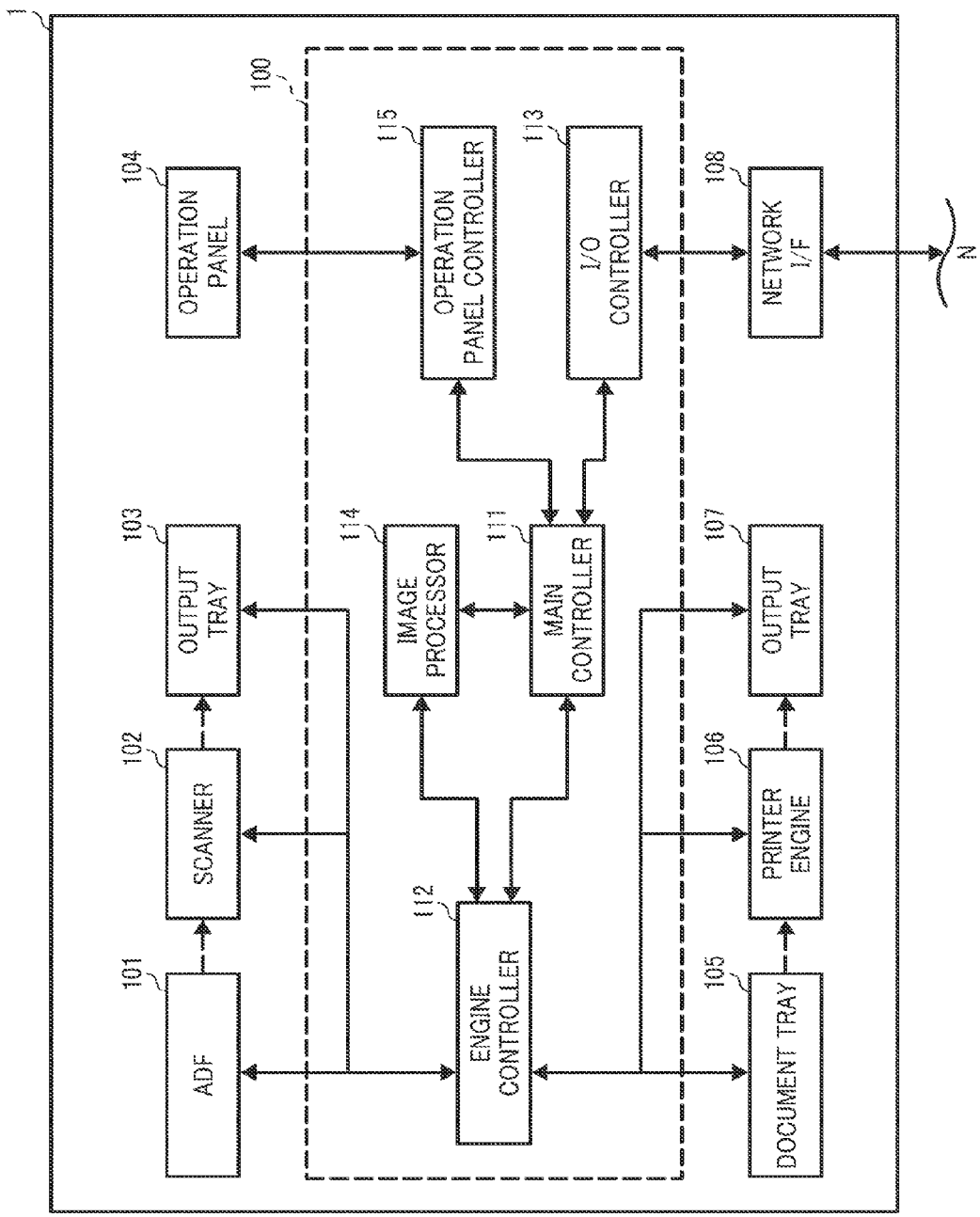
FIG. 2 is a schematic block diagram illustrating the hardware structure of an image forming apparatus according to an example embodiment of the present invention.

Referring now to FIG. 2, an example structure of the image forming apparatus 1 is explained according to an example embodiment of the present invention. The image forming apparatus 1 includes a controller 100, an automatic document feeder (ADF) 101, a scanner 102, an output tray 103, an operation panel 104, a document tray 105, a printer engine 106, an output tray 107, and a network interface (I/F) 108, which may be electrically coupled or connected with one another as the arrows indicate. The controller 110 includes a main controller 111, an engine controller 112, an input/output (I/O) controller 113, an image processor 114, and an operation panel controller 115, which may be connected or coupled via an internal bus.

The operation panel 104 may function as a user interface, which allows a user to input various information to the image forming apparatus 1, for example, by providing an input device such as various kinds of keys or buttons that may be pressed or selected by the user, a microphone, etc. Alternatively or additionally, the operation panel 104 may function as a user interface, which allows a user to obtain various information output by the image forming apparatus 1, for example, by providing an output device such as a display or a speaker. In this example, the operation panel 104 may be implemented by a liquid crystal display (LCD) integrated with a touch panel. The touch panel may allow the user to make the selection or instruction according to the contents of the screen displayed by the LCD. The contents of the screen may be controlled by the main controller 111 via the operation panel controller 115. For example, the selection or instruction made by the user may be sent to the main controller 110 via the operation panel controller 115. The main controller 110 analyzes the user input, and changes the contents of the screen according to the user input via the operation panel controller 115.

The ADF 101 feeds an original document, which may be placed on a document tray of the ADF 101, to an image reading section of the scanner 102. The scanner 102 reads the original document into image data, which may be provided by the ADF 101 or provided on an exposure glass of the scanner 102. The scanner 102 may be provided with a plurality of devices including a lighting device capable of emitting a light to the original document, and an imaging device such as a charged coupled device (CCD) capable of converting a light reflected from the original document into an image signal. The original document, which may be read by the scanner 102, may be output onto the output tray 103. The image data being obtained by the scanner 102 may be stored in any desired memory of the image forming apparatus 1 after being processed by the image processor 114. Alternatively or additionally, the image data being obtained by the scanner 102 may be sent to another apparatus on the network N through the network I/F 108 after being processed by the image processor 114 or being stored in the memory.

The document tray 105 stores a plurality of recording sheets. The printer engine 106 may include a plurality of devices to be used for forming an image of print data on a recording sheet using any desired image forming method including, for example, inkjet method, electrophotographic method, etc. The document tray 105 provides a recording sheet to the printer engine 106. The printed sheet is output onto the output tray 107.

The network I/F 108 allows the image forming apparatus 1 to communicate with a counterpart apparatus, such as the session management server 3, the information processing apparatus 2 or any other apparatus provided on the network N. For example, the network I/F 108 may be implemented by a network interface card capable of communicating in compliance with the Ethernet or Universal Serial Bus (USB). Further, in this example, the network I/F 108 may be provided with an input/output port for signaling channel, and an input/output port for data channel. For improved security, the input/output port for data channel is kept closed. When a session start instruction is received, for example, from the image processing management apparatus 6, the input/output port for data channel is made open so as to be ready for receiving data that may be sent from another apparatus provided on the network N.

The controller 110 may control operation of the image forming apparatus 1. For example, the controller 110 may be implemented by a processor such as a central processing unit (CPU) provided with a memory. The memory may include a volatile memory such as a dynamic random access memory (DRAM) or a RAM, and a non-volatile memory such as a read only memory (ROM), non-volatile RAM, or a hard disk drive (HDD).

The volatile memory may function as a work area of the CPU. The non-volatile memory may store various data including a session management program to be executed by the CPU. For example, upon activation of the image forming apparatus 100 or upon receiving a request from the user, the CPU may load the session management program from the non-volatile memory onto the volatile memory, and perform session management operation according to the session management program. Alternatively, the session management program may be stored in a removable memory such as an optical disc, and read out by the image forming apparatus 1. In such case, a device, such as a removable memory reader, may be additionally provided. Alternatively, the session management program may be stored in any storage device provided on the network N, and downloaded by the image forming apparatus 1 through the network I/F 108.

As shown in FIG. 2, the controller 110 may include one or more components depending on the function to be performed.

The main controller 111 controls entire operation of the controller 110. The engine controller 112 controls operation of one or more devices used for image forming, such as the printer engine 106 or the scanner 102.

The I/O controller 113 controls transmission or reception of data through the network I/F 108 under control of the main controller 111. Further, in this example, the I/O controller 113 may perform operation of managing a session, which may be established between the image forming apparatus 1 and any other apparatus provided on the network N, such as the session management server 3 or the information processing apparatus 2, according to the session management program.

Figure 29:
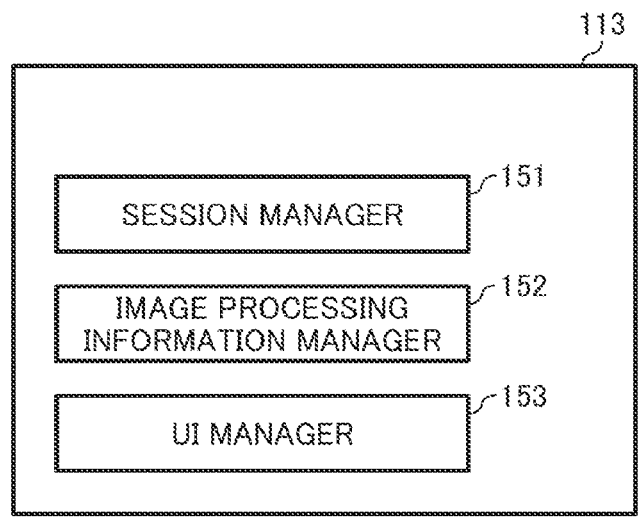
FIG. 29 is a schematic block diagram illustrating the functional structure of a portion of the image forming apparatus shown in FIG. 2, according to an example embodiment of the present invention.

For example, referring to FIG. 29, the I/O controller 113 may be provided with a session manager 151. In order to manage a session, the I/O controller 113 may manage various information to be used for communication with another apparatus, such as address information, or authentication information that may be used for secured communication.

Further, in this example, the session manager 151 may send a user request, which may be generated by the image forming apparatus 1 according to a user instruction received through the operation panel 104. Examples of the user request may include, but not limited to, a request for applying image processing, a request for transferring image data, a request for forming an image, and a request for applying post processing. Further, in this example, the session manager 151 may receive any data, such as a response or an instruction, from any apparatus provided on the network N.

Additionally, the I/O controller 113 may include an image processing information manager 152 and a user interface (UI) manager 153. The image processing information manager 152 manages image processing function information, which indicates various image processing functions provided by the image processing system of FIG. 1, which may be described below referring to FIG. 5.

The UI manager 153 manages various information regarding a graphical user interface (GUI), which may be displayed to the user through the operation panel 104 when requesting the user to input a user instruction, such as a user instruction for image processing or image forming, before generating a request.

Referring back to FIG. 2, the image processor 114 may perform various image processing to image data. For example, the image processor 114 may generate print data to be output to the printer engine 106, based on image data being input. The image data may be input by the scanner 102 or received from the network I/F 108. Alternatively, the image data may be previously stored in a memory of the image forming apparatus 1. Further, the image processor 114 may receive print data to be output from the network I/F 108.

In one example operation, the image forming apparatus 1 may perform printing operation. When the I/O controller 113 receives a printing request through the network I/F 108, the I/O controller 113 notifies the main controller 111 that the printing request is received. When the notification is received, the main controller 111 may cause the image processor 114 to generate print data according to the printing request. Further, the main controller 111 may cause the engine controller 112 to feed a recording sheet to the printer engine 106 from the document tray 105. The engine controller 112 may instruct the printer engine 106 to form an image of the print data on the recording sheet being fed by the document tray 105. The recording sheet having the image thereon may be output to the output tray 107.

In another example operation, the image forming apparatus 1 may perform scanning operation. When the operation panel controller 115 receives a scanning request through the operation panel 104, the operation panel controller 115 notifies the main controller 111 that the scanning request is received. Alternatively, when the I/O controller 113 receives a scanning request through the network I/F 108, the I/O controller 113 notifies the main controller 111 that the scanning request is received. When notification is received, the main controller 111 may cause the engine controller 112 to instruct the ADF 101 to feed the original document to the image reading section of the scanner 102 when the original document is provided to the ADF 101. Alternatively, the original document may be provided to the scanner 102. Under control of the main controller 111, the engine controller 112 may further cause the scanner 102 to scan the original document into image data. The engine controller 112 further causes the image data being obtained by the scanner 102 to be sent to the image processor 114. Under control of the main controller 111, the image processor 114 may apply image processing to the image data. The image data being processed may be stored in any desired memory of the image forming apparatus 1. Alternatively, the image data being processed may be sent to another apparatus on the network N through the I/O controller 113 and the network I/F 108.

In another example operation, the image forming apparatus 1 may perform copying operation. When the operation panel controller 115 receives a copying request through the operation panel 104, the operation panel controller 115 notifies the main controller 111 that the copying request is received. When the notification is received, the main controller 111 may cause the scanner 102 to generate image data, and the image processor 114 to perform image processing to the image data to generate print data. Under control of the main controller 111, the engine controller 112 causes the printer engine 106 to print an image of the print data.

In another example operation, the image forming apparatus 1 may perform data transferring operation. When the I/O controller 113 receives a data transfer request through the network I/F 108, the I/O controller 113 notifies the main controller 111 that the data transfer request is received. When the notification is received, the main controller 111 may send the image data to another apparatus on the network N through the I/O controller 113 and the network I/F 108.

The image forming apparatus 1 of FIG. 2 may be implemented in various other ways. For example, the image forming apparatus 1 may be additionally provided with the function of sending or receiving fax data. In such case, a fax controller and a fax communication interface may be additionally provided. When performing faxing operation, when the operation panel controller 115 receives a faxing request through the operation panel 104, the operation panel controller 115 notifies the main controller 111 that the faxing request is received. When the notification is received, the main controller 111 may cause the scanner 102 to generate image data, and the image processor 114 to perform image processing to the image data. The main controller 111 may further cause the fax controller to send the image data to another apparatus through the fax communication I/F via a communication line, such as a public switched telephone network (PSTN).

Figure 3:
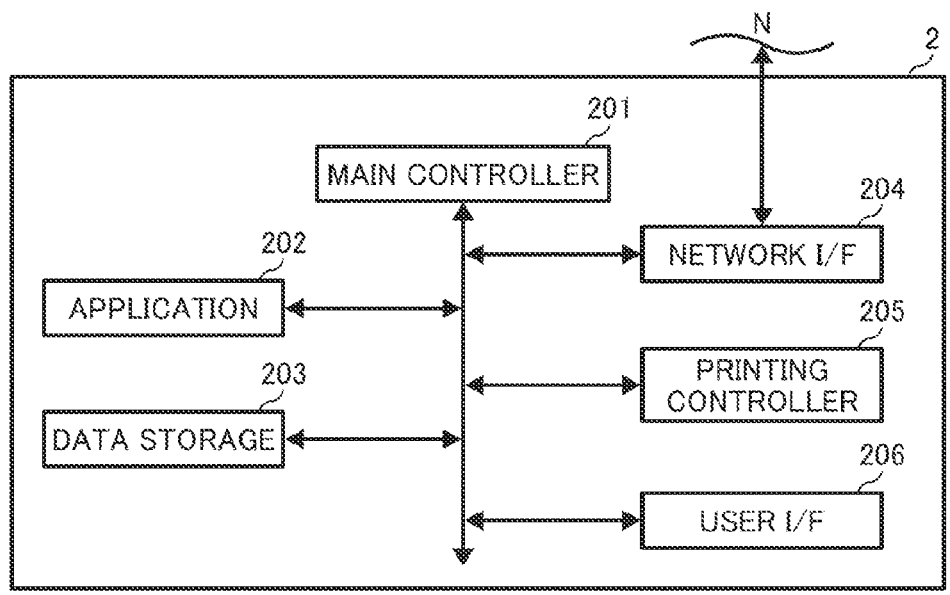
FIG. 3 is a schematic block diagram illustrating the structure of an information processing apparatus according to an example embodiment of the present invention.

Referring now to FIG. 3, a hardware structure of the information processing apparatus 2 is explained according to an example embodiment of the present invention. The information processing apparatus 2 mainly includes a main controller 201, an application 202, a data storage 203, a network I/F 204, a printing controller 205, and a user I/F 206.

The main controller 201 controls operation of the information processing apparatus 2. The main controller 201 may be implemented by a processor provided with a memory, such as a central processing unit (CPU) provided with a ROM and a RAM.

The application 202 may include various kinds of application programs that may be run on an operating system (OS) installed on the information processing apparatus 2. Examples of the application 202 may include, but not limited to, any desired application program providing the function of generating or editing data such as a word processing program, a drawing program, and a spreadsheet program, or any desired application program providing the function of allowing web browsing such as a web browser. The application 202 may be activated by the user at any desired time. Alternatively, the application 202 may be activated upon execution of the main controller 201.

The data storage 203 may store various data including, for example, the image data generated by the application 202, various information to be used for communication with a counterpart apparatus, or various information to be used for generating a request. In this example, the data storage 203 may be implemented by any desired non-volatile memory, such as a hard disk drive (HDD).

The network I/F 204 may function as an interface, which allows the information processing apparatus 2 to communicate with a counterpart apparatus such as the image processing management apparatus 6 or the image forming apparatus 1 via the network N.

The printing controller 205 may manage various information regarding image processing or image forming to be requested by the user. For example, the printing controller 205 may allow the user to determine settings information regarding image forming, for example, by requesting the user to confirm the printing settings. In another example, the printing controller 205 may provide information regarding the printing operation to the user, which is obtained through monitoring the printing operation performed by the image processing system shown in FIG. 1.

In this example, the printing controller 205 may be provided in the form of computer program, which may be previously stored in any desired storage device or medium. For example, upon activation of the CPU of the main controller 201, the computer program, which may be referred to as the printing control program, may be loaded onto the memory of the main controller 201 to cause the CPU of the main controller 201 to have the function of the printing controller 205.

The user I/F 206 may function as an interface, which allows interaction between the information processing apparatus 2 and the user. The user I/F 206 may be implemented by an input device such as a mouse, a keyboard, a microphone, etc., and an output device such as a display, a speaker, etc. Alternatively, the user I/F 206 may be implemented by a display provided with a touch panel. Through the user I/F 206, the user may be able to operate the image processing system of FIG. 1 through the information processing apparatus 2 or obtain information regarding the image processing system of FIG. 1 through the information processing apparatus 2.

Figure 4:
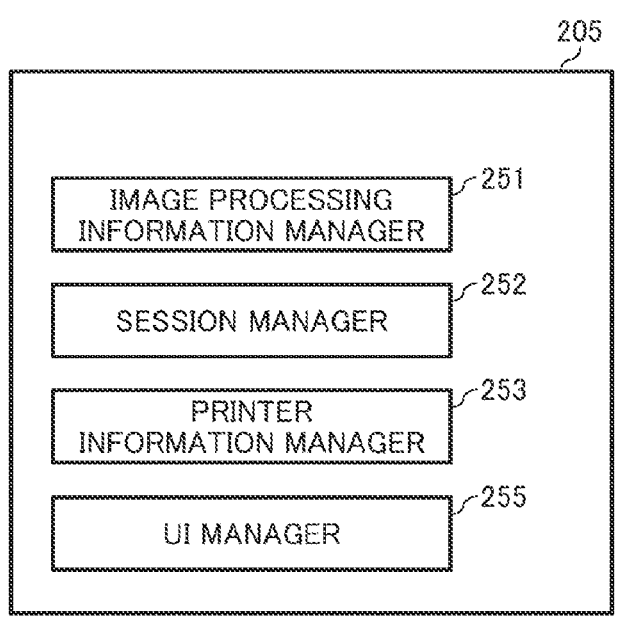
FIG. 4 is a schematic block diagram illustrating the functional structure of a printing controller of the information processing apparatus shown in FIG. 3.

Referring now to FIG. 4, an example structure of the printing controller 205 of FIG. 3 is explained according to an example embodiment of the present invention. The printing controller 205 of FIG. 4 includes an image processing information manager 251, a session manager 252, a printer information manager 253, and a user interface (UI) manager 255.

Figure 5:
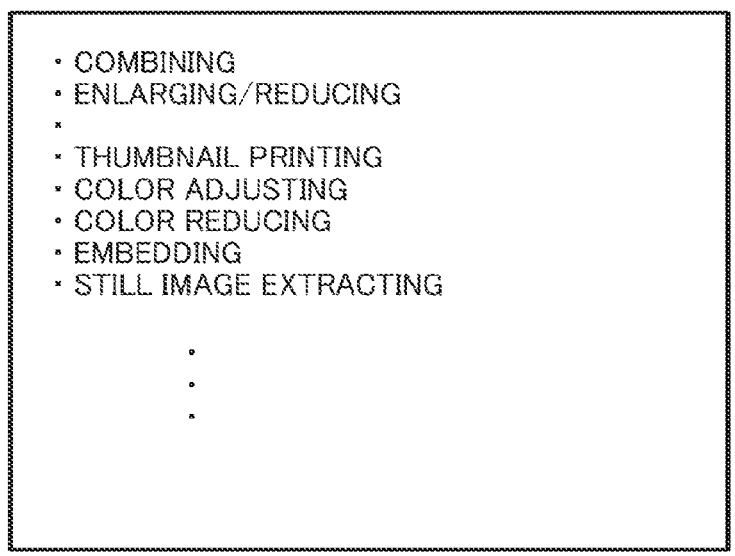
FIG. 5 is an illustration for explaining an image processing function managed by the printing controller of FIG. 4.

The image processing information manager 251 manages image processing function information, which indicates various image processing functions provided by the image processing system of FIG. 1. For example, as illustrated in FIG. 5, the image processing function information may include information regarding a plurality of image processing functions including editing such as combining or enlarging/reducing, thumbnail printing, color adjusting, color reducing, embedding, still image extracting, etc.

The editing function includes the function of combining a plurality of pages so as to fit into one sheet of recording medium, the function of adjusting the order or orientation of a plurality of pages, the function of printing on one side or both sides of recording medium, the function of enlarging the image size, the function of reducing the image size, etc. The thumbnail printing function allows the user to print a thumbnail document that includes a thumbnail image generated for image data specified by the user. The color adjusting function may adjust the color of the image data to be printed, such as hue, brightness, or tone. The color reducing may reduce the color information of image data, for example, by converting the full-color image data to the binary image data. The embedding function allows the user to embed data, such as a watermark, into the image data. The still image extracting function allows the user to extract one or more still images from the moving image for printing.

The session manager 252 manages communication between the information processing apparatus 2 and the session management server 3 via the network N, for example, by sending a request for starting a session to the session management server 3 or managing the session with the session management server 3 when established. Alternatively, under control of the session management server 3, the session manager 252 controls communication between the information processing apparatus 2 and at least one of a plurality of apparatuses provided on the network N. In order to manage communication, or a session, with another apparatus on the network, the session manager 252 may manage various information to be used for communication with another apparatus. For example, the session manager 252 may obtain address information specifying the current location of the counterpart apparatus such as the network address including, for example, IP address that may be stored with respect to the SIP URI. Additionally, the session manager 252 may obtain authentication information to be used for secured communication such as encrypted key or decrypted key to establish the virtual private network (VPN) communication.

In this example, in addition to managing a request for starting or establishing a session, the session manager 252 may send a user request, which may be generated by the information processing apparatus 2 according to a user instruction received through the user I/F 206, to the session management server 3. Examples of the user request may include, but not limited to, a request for applying image processing, a request for transferring image data, a request for forming an image, and a request for applying post processing. Further, in this example, the session manager 252 may receive any data, such as a response or an instruction, from any apparatus provided on the network N.

The printer information manager 253 manages various information regarding the image forming apparatus 2 or any other image forming apparatus that may be provided on the network N, which may be referred to as the printer information. In this example, the printer information may include identification information identifying the image forming apparatus 1, or address information specifying the current location of the image forming apparatus 1 such as the network address of the image forming apparatus 1.

The UI manager 254 manages various information regarding a graphical user interface (GUI), which may be displayed to the user through the user I/F 206 when requesting the user to input a user instruction, such as a user instruction for image processing or image forming, before generating a request.

Figure 6:
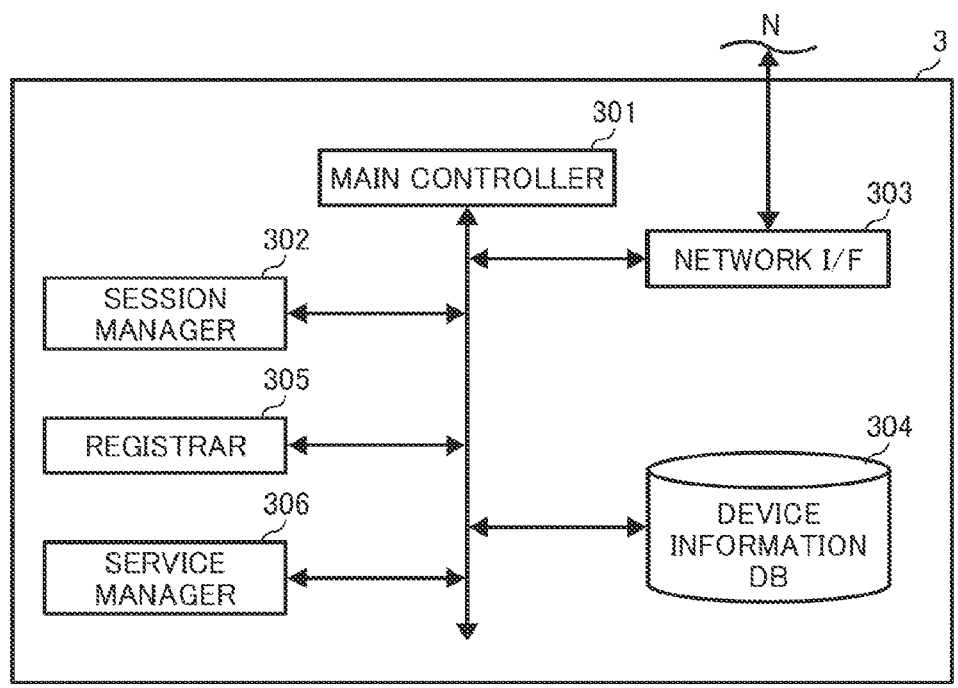
FIG. 6 is a schematic block diagram illustrating the structure of a session management server according to an example embodiment of the present invention.
Figures 7, 8:
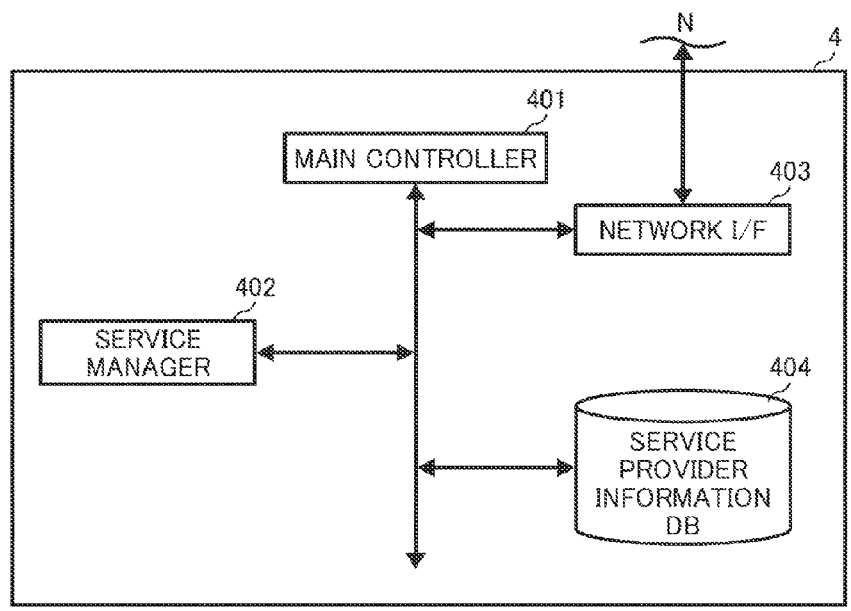
FIG. 7 is an illustration for explaining device information managed by the session management server shown in FIG. 6.
FIG. 8 is a schematic block diagram illustrating the structure of a service management server according to an example embodiment of the present invention.

Referring to FIGS. 6 to 9, a functional structure of the image processing management apparatus 6 including the session management server 3 and the service management server 4 is explained according to an example embodiment of the present invention. In this example, referring to FIG. 6, the session management server 3 includes a main controller 301, a session manager 302, a network I/F 303, a device information storage database (DB) 304, a registrar 305, and a service manager 306. Referring to FIG. 8, the service management server 4 includes a main controller 401, a service manager 402, a network I/F 403, and a service provider information DB 404.

The main controller 301 controls operation of the session management server 3.

The session manager 302 manages communication between the session management server 3 and at least one of a plurality of apparatuses provided on the network N, or communication among at least two of a plurality of apparatuses provided on the network N. For example, when the request for starting a session with the session management server 3 is received from the information processing apparatus 2, the session manager 302 sends a response to the information processing apparatus 2 to establish a session with the information processing apparatus 2. In another example, when the request for starting a session with the image forming apparatus 1 is received from the information processing apparatus 2, the session manager 302 sends a request to the image forming apparatus 1 to establish a session between the information processing apparatus 2 and the image forming apparatus 1.

In this example, the session manager 302 may receive a request from any apparatus provided on the network N such as the information processing apparatus 2. When the request is received, the session manager 302 may send the request to the service manager 306 under control of the main controller 301. When an instruction, which may be generated by the session manager 306, is received under control of the main controller 301, the session manager 302 may send the instruction to any apparatus provided on the network N to cause the apparatus provided on the network N to process the request being received according to the instruction.

The registrar 302 obtains various information regarding a plurality of apparatuses provided on the network N at the time of registering. For example, when the request for registering is received from the image forming apparatus 1, the registrar 302 may request the image forming apparatus 1 to send device information regarding the image forming apparatus 1. The device information may be stored in the device information DB 304 or the service provider information DB 404. Examples of the device information may include, but not limited to, location information specifying a current address of the image forming apparatus 1 such as IP address that may be stored with respect to the SIP URI, image processing function information regarding an image processing function to be provided by the image forming apparatus 1, and data format information interpretable by the image forming apparatus 1. Additionally, at the time of registering, the registrar 205 may request the image forming apparatus 1 to send authentication information such as the encryption or description key, and store the authentication information in the device information DB 304 or the service provider information DB 404. The authentication information may be used for secured communication, such as VPN communication that may use IPsec, once the session is established.

Referring now to FIG. 7, an example data structure of the device information DB 304 is explained according to an example embodiment of the present invention. In this example, the device information DB 304 stores device information for the image forming apparatus 1 and the information processing apparatus 2, which may be referred to as the registered apparatus. The device information DB 304 stores, for each registered apparatus, device information including, for example, identification number (ID), identification information (NAME), address information (ADDRESS), authentication information (KEY), data format information (FORMAT), image processing function information (FUNCTION), or current status information (STATUS). The identification number may be arbitrarily assigned to each registered apparatus, for example, according to the order of registration. The identification information may be a name uniquely assigned to each registered apparatus. The address information may include a network address of the registered apparatus such as IP address. The authentication information may include information regarding an encryption or decryption key provided by the registered apparatus. The data format information may include information regarding a data format interpretable by the registered apparatus, such as information regarding an application used for generating image data, which may be obtainable from the extension section of the file name such as "jpg" "pdf", or "doc" or "MIME" type information. The image processing function information indicates an image processing function to be provided by the registered apparatus, such as an image processing function described above referring to FIG. 5. The current status information may include information regarding a current status of the registered apparatus, which indicates whether the registered apparatus is turned on or the registered apparatus is connected to the network N. Additionally, the device information may include supply information regarding the supply of the image forming apparatus 1, such as the supply of the printer engine 106 including the amount of toner or ink, or the supply of the document tray 105 including the amount of recording sheets. The supply information may be obtained by a detector such as a counter or a sensor that may be provided on the image forming apparatus 1.

Referring back to FIG. 6, the service manager 306 may generate an instruction, which may determine operation to be performed by the image processing system of FIG. 1. For example, when the request for forming an image of image data is received from the information processing apparatus 2 through the session manager 306, the service manager 306 may refer to the device information DB 304 to determine whether the data format of the image data specified by the request is interpretable by the image forming apparatus 1 to generate a determination result. In another example, when the request for applying image processing to image data is received from the information processing apparatus 2 through the session manager 306, the service manager 306 may refer to the device information DB 304 to determine whether the image processing specified by the request can be applied by the image forming apparatus 1 to generate a determination result. Based on the determination result, the service manager 306 may generate an instruction specifying how the request is processed, and cause the session manager 302 to send the instruction through the network I/F 303.

The network I/F 303 may function as an interface that allows communication between the session management server 3 and at least one of a plurality of apparatuses provided on the network N.

Referring to FIG. 8, the main controller 401 controls operation of the service management server 4.

The service manager 402 may generate an instruction, which specifies operation to be performed by the image processing system of FIG. 1. For example, when an instruction for determining whether the service providing server 5 is capable of applying specific data conversion is received, the service manager 402 may refer to the service provider information DB 404 to determine whether the service providing server 5 is capable of applying specific data conversion to generate a determination result. In another example, when an instruction for determining whether the service providing server 5 is capable of applying specific image processing is received, the service manager 402 may refer to the service provider information DB 404 to determine whether the service providing server 5 is capable of applying specific image processing to generate a determination result.

Figures 9, 10:
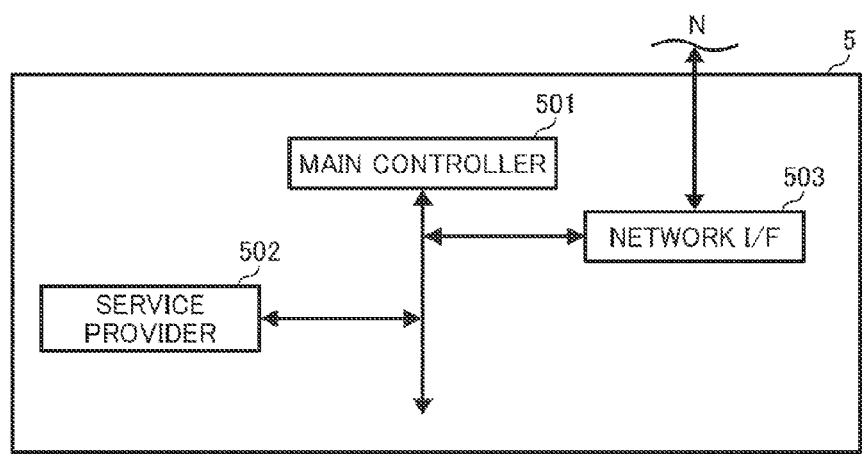
FIG. 9 is an illustration for explaining device information managed by the service management server shown in FIG. 8.
FIG. 10 is a schematic block diagram illustrating the structure of a service providing server according to an example embodiment of the present invention.

Referring to FIG. 9, an example data structure of the service provider information DB 404 is explained according to an example embodiment of the present invention. In this example, the service provider information DB 404 stores device information for the service providing server 5 including a plurality of servers each providing a service, such as an image processing function, as described above referring to FIG. 1. The service provider information DB 404 stores, for at least one device of the service providing server 5, device information including, for example, identification number (ID), identification information (NAME), address information (ADDRESS), data format information (FORMAT), or image processing function information (FUNCTION). The identification number may be arbitrarily assigned to each device of the service providing server 5, for example, according to the order of registration. The identification information may be a name uniquely assigned to each device of the service providing server 5. The address information may include a network address of each device of the service providing server 5 such as IP address. The data format information may include information regarding a data format interpretable by each device of the service providing server 5. The image processing function information indicates an image processing function to be provided by each device of the service providing server 5, such as an image processing function described above referring to FIG. 5. Further, the service provider information DB 404 may additionally store authentication information of each device of the service providing server 5, such as an encrypted key or decrypted key, which may be used for secured communication with another apparatus on the network N.

The network I/F 403 may function as an interface that allows communication between the service management server 4 and at least one of a plurality of apparatuses provided on the network N.

As described above referring to FIG. 1, the session management server 3 and the service management server 4 may be implemented as one device. Alternatively, the session manager 302 and the device information DB 304 may be provided by the service management server 4. In such case, the service management server 4 may determine whether the data format specified by the request is interpretable by the image forming apparatus 1 or the image processing specified by the request can be applied by the image forming apparatus 1. Further, any one the device information DB 304 and the service provider information DB 404 may be provided at any desired location on the network N. Alternatively, any portion of the device information DB 304 and the service provider information DB 404 may be provided on a removable medium.

In another example, the service management server 4 does not have to be provided with the service provider information DB 404. In such case, device information of the service providing server 5 may be obtained directly from the service providing server 5, for example, by using simple object access protocol (SOAP). In a substantially similar manner, the session management server 3 does not have to be provided with the device information DB 304.

In another example, the image processing management apparatus 6, or at least one of the session management server 3, the service management server 4, and service providing server 5, may provide a web service capable of providing at least a portion of the functions of the printing controller 205 or the I/O controller 113. In such case, as long as the information processing apparatus 2 or the image forming apparatus 1 is provided with the function of web browsing, such as a web browser, the information processing apparatus 2 or the image forming apparatus 1 can provide the function same as the function of the printing controller 205 or the I/O controller 113 described above, even not all components of the printing controller 205 or the I/O controller 113 are not provided.

For example, the function provided by the image processing information manager 251 may be provided by a server provided on the network B. In such case, the information processing apparatus 1 does not have to update the image processing function information every time the image processing function information is updated, for example, due to the addition of a new service providing server 5 or the change in function of the service providing server 5. In another example, the function of the UI manager 255 may be provided by a web server provided on the network B. In such case, information regarding the GUI may be uploaded by the web browser from the web server, and stored in the data storage 203.

Figure 30:
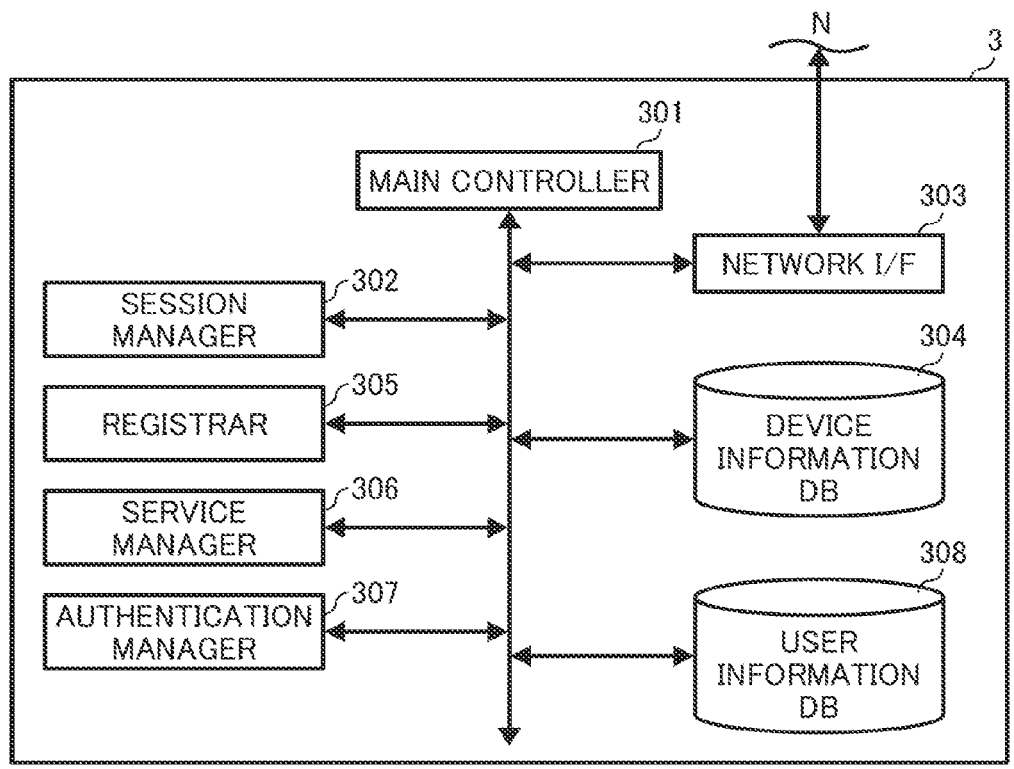
FIG. 30 is a schematic block diagram illustrating the structure of a session management server, according to an example embodiment of the present invention.

In another example, referring to FIG. 30, the session management server 3 may be additionally provided with an authentication manager 307 having the function of authenticating a user and a user information DB 308. The user information DB 308 may store user authentication information to be used for user authentication, such as a set of user ID and password for each registered user. In such case, the session manager 302 may obtain user authentication information from an apparatus provided on the network N at the time of registering the apparatus. The authentication manager 307 may refer to the user information DB 308 to determine whether the user at the apparatus is a registered user to generate a determination result. For example, the user authentication information being obtained from the session manager 302 may be compared with the user authentication information being stored in the user information DB 308. Based on the determination result, the session manager 302 may accept a request sent or to be sent from the apparatus. In this example, the user information DB 308 may be provided at any desired location on the network N. However, by providing the user information DB 308 separately from the image forming apparatus 1, the user information DB 308 may be easily managed by an administrator of the image processing system of FIG. 1. For example, when the user is authenticated by the authentication manager 307 of the session management server 3, the image forming apparatus 1 may download information regarding the user from the user information DB 308, and store the information regarding the user in its memory, such as the memory provided in the controller 100. In this manner, the resource of the image forming apparatus 1 may be efficiently used.

Referring now to FIG. 10, a functional structure of the service providing server 5 is explained according to an example embodiment of the present invention. The service providing server 5 includes a main controller 501, a service provider 502, and a network I/F 503.

The main controller 501 controls operation of the service providing server 5.

The service provider 502 may provide a service, such as an image processing function, to any apparatus provided on the network N, for example, according to an instruction received from the session management server 3 or the service management server 4. For example, when an instruction for applying data conversion to image data is received from the service management server 4, the service provider 502 may apply data conversion to the image data. In another example, when an instruction for applying image processing to image data is received from the service management server 4, the service provider 502 may apply image processing to the image data.

The network I/F 503 may function as an interface that allows communication between the service providing server 5 and at least one of a plurality of apparatuses provided on the network N.

As described above referring to FIG. 1, any one of the session management server 3, the service management server 4, and the service providing server 5 may be each implemented by any device having a processor such as a CPU provided with a memory. In such case, a control program may be previously stored in the memory such as a ROM. Upon execution of the CPU, the control program being stored in the ROM may be loaded onto a RAM to cause the CPU to operate a plurality of functions describe above referring to any one of FIGS. 6 to 10.

Figure 31:
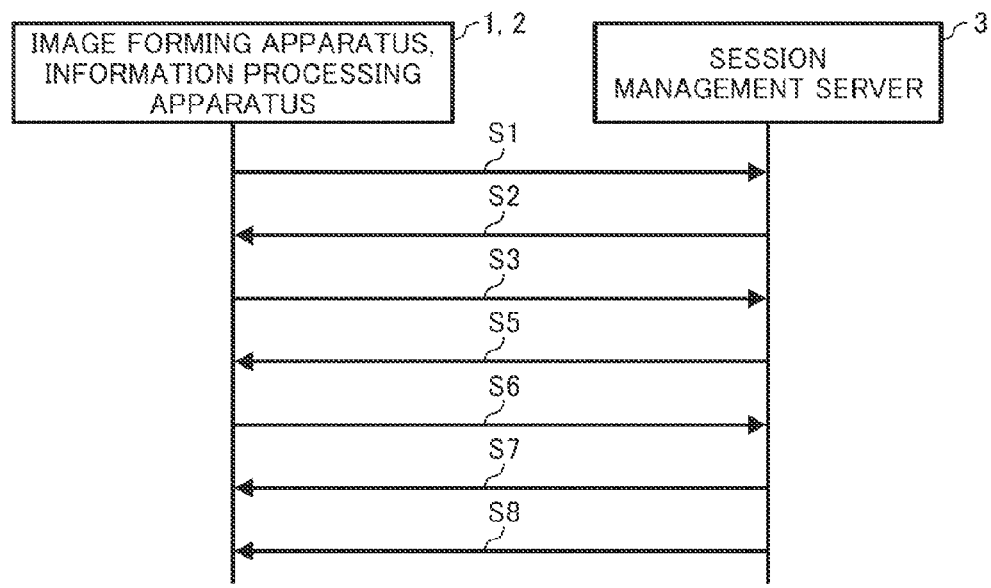
FIG. 31 is an illustration for explaining operation of registering, performed by an image processing system, according to an example embodiment of the present invention.

Referring now to FIG. 31, operation of registering a plurality of apparatuses provided on the network N, performed by the session management server 3, is explained according to an example embodiment of the present invention. In this example, registration of the image forming apparatus 1 may be explained as a way of example since registration of the information processing apparatus 2 may be performed in a substantially similar manner.

When the image forming apparatus 1 is connected to the network N and the power is turned on, at S1, the I/O controller 113 of the image forming apparatus 1 sends a register request for registration to the session management server 3, for example, according to the SIP. When the register request is received, at S2, the session management server 3 may request the image forming apparatus 1 to send authentication information, for example, by sending a response to the image forming apparatus 1. At S3, the image forming apparatus 1 may send authentication information to the session management server 3.

At S4, the session management server 3 may store the authentication information when the authentication information includes an encrypted or decrypted key to be used for secured communication, together with other information such as the address information. Alternatively, at S4, the session management server 3 may determine whether the user at the image forming apparatus 1 is a registered user when the authentication information includes user authentication information such as a user ID and a password to generate a determination result. In such case, only when the determination result indicates that the user has been registered, the session management server 3 may accept the request sent from the image forming apparatus 1 and store information provided by the image forming apparatus 1.

At S5, the session management server 3 may further request the image forming apparatus 1 to send device information, for example, by sending a response to the image forming apparatus 1. At S6, the image forming apparatus 1 may send the device information to the session manager 3.

When the device information is received, at S7, the session management server 3 may store the device information in the device information DB 304.

Further, at S8, the session management server 3 may send a selected portion of the device information to the image forming apparatus 1.

For example, the image forming apparatus 1 may store image processing function information obtained from the session management server 3 in the image processing information manager 152 (FIG. 29). Based on the image processing function information, the image forming apparatus 1 may generate a GUI that allows the user to input a user instruction for applying image processing. For example, the UI manager 153 of the I/O controller 113 (FIG. 29) may generate a screen providing a list of image processing functions available for use based on the image processing function information being obtained. The main controller 111 (FIG. 2) may cause the operation panel controller 115 to display the screen being generated through the operation panel 104, for example, when a user instruction is received.

The information processing apparatus 2 may be registered in a substantially similar manner as described above referring to S1 to S8. At S8, in addition to receiving image processing function information, the information processing apparatus 2 may receive device information regarding the image forming apparatus 1 from the device information DB 304, and store the device information in the printer information manager 253 (FIG. 4). Based on the device information obtainable from the printer information manager 253, the UI manager 254 of the information processing apparatus 1 may generate a screen providing a list of image forming apparatuses available for use. The main controller 201 (FIG. 3) may cause the user I/F 206 to display the screen being generated, for example, when a user instruction is received.

Further, any device information that is registered may be updated by the session management server 3 at any desired time. In one example, the session management server 3 may periodically request the image forming apparatus 1 or the information processing apparatus 2 to send device information. In another example, the session management server 3 may update the device information at the time when the image forming apparatus 1 or the information processing apparatus 2 sends presence information indicating that the image forming apparatus 1 or the information processing apparatus 2 is on line. In another example, the session management server 3 may update the device information at the time of receiving a request, such as a request for image processing or a request for image forming.

When the device information is updated, the UI manager 153 or 254 may update the screen according to the updated information. For example, a first screen is assumed to be generated based on the device information, which is obtained from the image processing management apparatus 6 at the time of registering. When a new device is added, for example, to the service providing server 5, the device information being obtained from the image processing management apparatus 6 may be updated to include device information including the new device that has been added. According to the updated information, the first screen is changed to a second screen that additionally includes at least a part of the device information regarding the new device.

Referring now to FIGS. 11 to 17, 25, 26, and 27, image processing operation and image forming operation performed by the image processing system of FIG. 1 are explained according to an example embodiment of the present invention. In this example, the information processing apparatus 2 generates a user request according to a user instruction received through the user I/F 206. Specifically, in this example, it is assumed that the user request includes an image processing request that requests for specific image processing to be applied to image data to generate processed image data, and an image forming request that instructs the image processing management apparatus 6 to output an image of the processed image data through the image forming apparatus 1.

When the user request is received from the information processing apparatus 2, the image processing management apparatus 6 analyzes the user request to determine how image processing and image forming should be performed by the image processing system of FIG. 1. Specifically, in this example described below referring to any one of FIGS. 11 to 17, 25, 26, and 27, the image processing management apparatus 6 determines whether the data format of the image data is interpretable by the image forming apparatus 1, which is designated to process the image forming request, to generate a determination result. Further, the image processing management apparatus 6 determines whether the specific image processing can be applied by the image forming apparatus 1 to generate a determination result. Based on the determination result, the image processing management apparatus 6 may generate an instruction, which specifies how a plurality of apparatuses on the network N including the image forming apparatus 1 and the information processing apparatus 2 should operate to process the user request.

Figure 11:
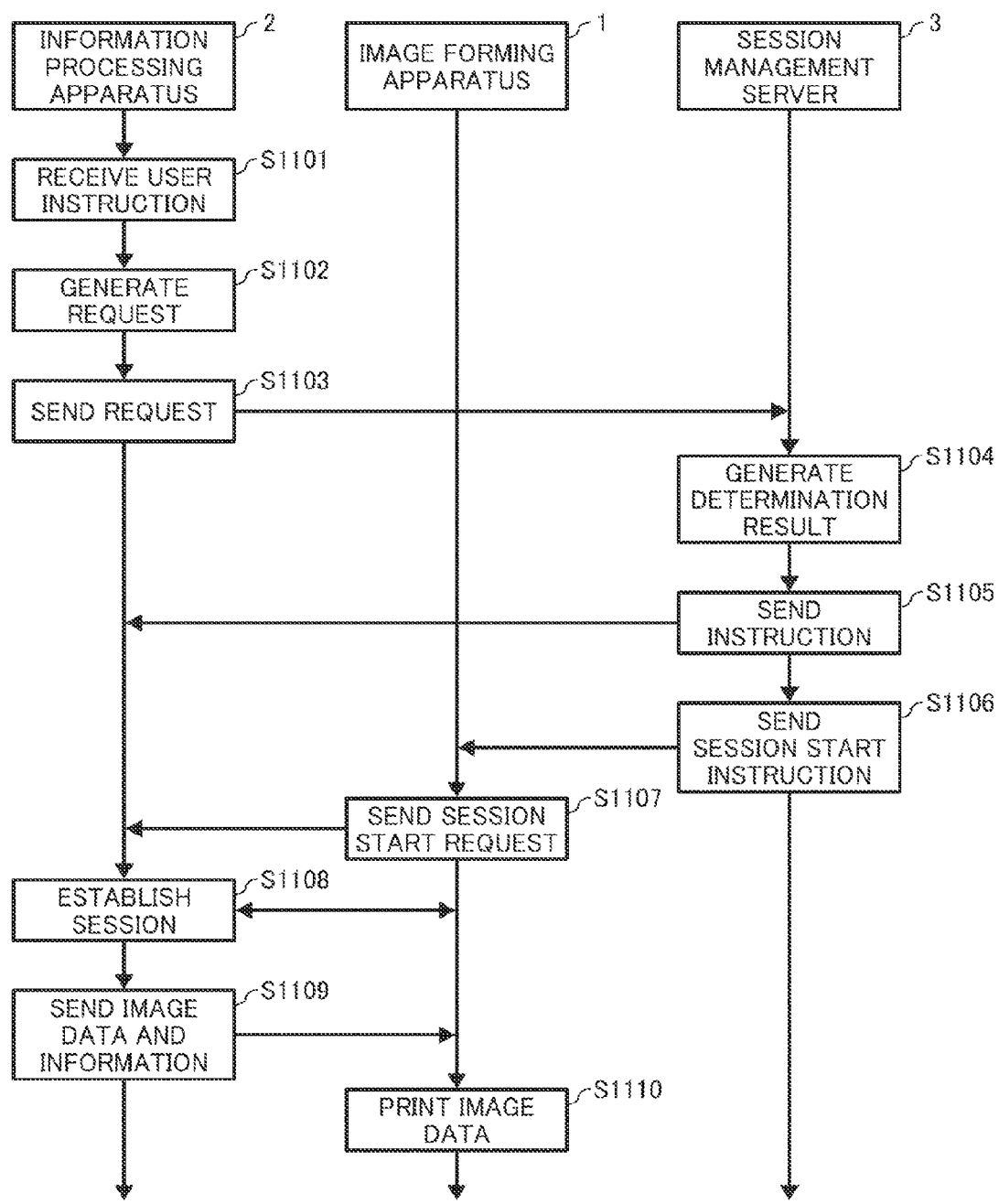
FIG. 11 is a data sequence diagram illustrating operation of processing a user request, according to an example embodiment of the present invention.

FIG. 11 illustrates an example case in which the image processing management apparatus 6 of the image processing system of FIG. 1 determines that the image forming apparatus 1 is capable of interpreting the data format of the image data and applying the specific image processing to the image data to generate the processed image data.

At S1101, the information processing apparatus 2 receives a user instruction for printing image data after applying specific image processing. For example, when the user instruction is input by the user while the image data is displayed through the user I/F 206 by the application 202, the printing controller 205 (FIG. 3) may be executed. The printing controller 205 may display the user via the user I/F 206 a screen for setting various information regarding image processing and image forming of the image data, which may be generated by the UI manager 255 (FIG. 4) based on the image processing function information or the printer information described above referring to FIGS. 4 and 5.

Figure 12:
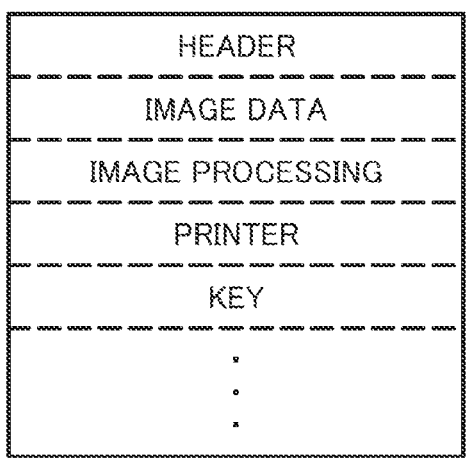
FIG. 12 is an illustration for explaining information contained in a user request, according to an example embodiment of the present invention.

At S1102, when the information regarding image processing and image forming of the image data is set by the user and an instruction for printing the image data after applying image processing is confirmed by the user, the printing controller 205 may generate an image processing request for applying specific image processing and an image forming request for forming an image, which may be collectively referred to as a user request. The user request includes information regarding image processing and image forming of the image data. For example, as illustrated in FIG. 12, the user request includes header information ("HEADER"), image data information regarding the image data to be processed ("IMAGE DATA"), image processing information indicating specific image processing to be applied to the image data ("IMAGE PROCESSING"), printer information regarding the specific image forming apparatus to form an image of the processed image data ("PRINTER"), or encryption key information to be used for secured communication ("KEY").

At S1103, the main controller 201 of the information processing apparatus 2 sends the user request to the session management server 3 through the network I/F 204.

When the session manager 302 of the session management server 3 receives the user request from the information processing apparatus 2 through the network I/F 303, at S1104, the service manager 306 of the session management server 3 (FIG. 6) analyzes the user request to generate a determination result indicating how the image processing system of FIG. 1 should process the user request. For example, the service manager 306 may obtain the image data information and the printer information respectively from the user request, and determine whether the image data being selected has a data format interpretable by the image forming apparatus 1 specified by the printer information. In this example, when the image processor 114 of the image forming apparatus 1 is capable of interpreting the data format of the image data and generating print data to be processed by the printer engine 106, it is assumed that the image data is interpretable by the image forming apparatus 1. In this example, the service manager 306 may determine whether the data format is interpretable by the image forming apparatus 1 by referring to the data format information stored in the device information DB 304 (FIG. 7).

Additionally, the service manager 306 may obtain the image processing information and the printer information respectively from the user request, and determine whether the image processing specified by the image processing information can be applied by the image forming apparatus 1 specified by the printer information. In this example, when the image processor 114 of the image forming apparatus 1 has the image processing function that corresponds to the image processing specified by the image processing information, it is assumed that the image processing can be applied by the image forming apparatus 1. For example, when the image processing information indicates the thumbnail printing function described above referring to FIG. 5 is to be applied, the service manager 306 of the session management server 3 determines whether the image forming apparatus 1 has the thumbnail printing function. In this example, the service manager 306 may determine whether the image processing can be applied by the image forming apparatus 1, by referring to the image processing function information stored in the device information DB 304 (FIG. 7).

In this example, it is assumed that the determination result generated by the service manager 306 indicates that the data format is interpretable by the image forming apparatus 1 and the image processing can be applied by the image forming apparatus 1.

At S1105, the session manager 302 sends an instruction generated based on the determination result obtained at S1104 to the information processing apparatus 2. The instruction may indicate that the user request can be processed by the image forming apparatus 1.

At S1106, the session manager 302 sends a session start instruction to the image forming apparatus 1 through the network I/F 303, which instructs the image forming apparatus 1 to start a session with the information processing apparatus 2. The session start instruction may include address information of the information processing apparatus 2 and encryption key information obtained from the information processing apparatus 2, which are respectively stored in the device information DB 304.

Further, in this example, when the session start instruction is received from the session management server 3, the image forming apparatus 1 opens an input/output port for data channel, which is kept closed.

At S1107, the image forming apparatus 1 sends a session start request to the information processing apparatus 2 through the network I/F 108, which requests the information processing apparatus 2 to start a session with the image forming apparatus 1. In this example, the image forming apparatus 1 may communicate with the information processing apparatus 1 using the encryption key information. Further, the session start request may include address information of the image forming apparatus 1 and authentication information of the image forming apparatus 1.

When the information processing apparatus 2 receives the session start request, at S1108, the information processing apparatus 2 sends a session start response to the image forming apparatus 1 to establish a session with the image forming apparatus 1. In this example, the information processing apparatus 2 may communicate with the image forming apparatus 1 using the encryption key information.

When the session is established between the information processing apparatus 2 and the image forming apparatus 1 at S1108, at S1109, the printing controller 205 of the information processing apparatus 2 sends the image data to be processed, and the image processing information that may be generated at S1102, to the image forming apparatus 1 through the network I/F 204.

When the image forming apparatus 1 receives the image data and the image processing information, at S1110, the image processor 114 of the image forming apparatus 1 applies image processing specified by the image processing information to generate processed image data. The engine controller 112 may cause the printer engine 106 to form an image of the processed image data, and the operation ends.

In this example, before establishing the session at S1108, for example, at S1103, S1105, S1106, S1107, and S1108, communication between at least two of the information processing apparatus 2, the session management server 3, and the image forming apparatus 1 may be performed through a signaling channel, for example, using the signaling protocol such as the SIP. After establishing the session at S1108, for example, at S1109, communication between the information processing apparatus 2 and the image forming apparatus 1 may be performed through a data channel, for example, using the HTTP. Further, in this example, any desired type of secured communication may be implemented.

The operation of FIG. 11 may be performed in various other ways. For example, at S1103, the information processing apparatus 2 may send the image data to be processed together with the user request to the session management server 3. In such case, the user request does not have to be provided with the image data information since the session management server 3 is capable of determining whether the data format of the image data is interpretable by the image forming apparatus 1, by analyzing the image data file.

In another example, instead of causing the information processing apparatus 2 to send the image data or the image processing information to the image forming apparatus 1 at S1109, the session management server 3 may send the image data or the image processing information to the image forming apparatus 1. In such case, the session management server 3 may send a notice to the information processing apparatus 2 that the user request is processed by the image forming apparatus 1. Further, the session management server 3 requests the image forming apparatus 1 to start a session with the session management server 3.

In another example, at S1104, the session management server 3 may additionally determine whether the image forming apparatus 1 has enough resource to process the image forming request. For example, when the image forming request is received, the session management server 3 may obtain printer supply information from the image forming apparatus 1, and analyze the printer supply information to determine whether the image forming apparatus 1 is capable of forming an image. Alternatively, the printer supply information may be obtained from the device information DB 304 at any desired time. The printer supply information may include information regarding the printer supply, such as the amount of toner remained in a toner container or the remaining number of recording sheets provided in the document tray 105, which may be obtained by a detector provided by the document tray 105 or the printer engine 106. When the printer supply information indicates that there is not enough resource to process the image forming request, the session management server 3 may send a notice to the information processing apparatus 2 without sending the session start instruction to the image forming apparatus 1. When the notice is received, the user at the information processing apparatus 2 may replace the toner container or place additional recording sheets to the documents tray 105, depending on the notice being received. When the session management server 3 receives a notice from the image forming apparatus 1 that the printer supply is replenished, the session management server 3 may proceed to S1106 to send the session start instruction to the image forming apparatus 1. Instead of sending the notice to the information processing apparatus 2 in case when the shortage of the printer supply is detected, the session management server 3 may send a notice to an information processing apparatus where the administrator is logged on or an image forming processing apparatus of any other person who may be responsible for managing the image forming apparatus 1.

In another example, at S1101, the user may request the information processing apparatus 2 to print image data, which is stored in the data storage 203 (FIG. 3), after applying image processing. In such case, the application 202 does not have to be executed.

Alternatively, at S1101, the user may request the information processing apparatus 2 to print image data, which is stored at any desired location on the network N. In such case, the printing controller 205 does not have to be executed as long as the web browser of the application 202 is executed to receive various information regarding image processing or image forming, from the other apparatus providing the web service to the information processing apparatus 2.

Figure 13:
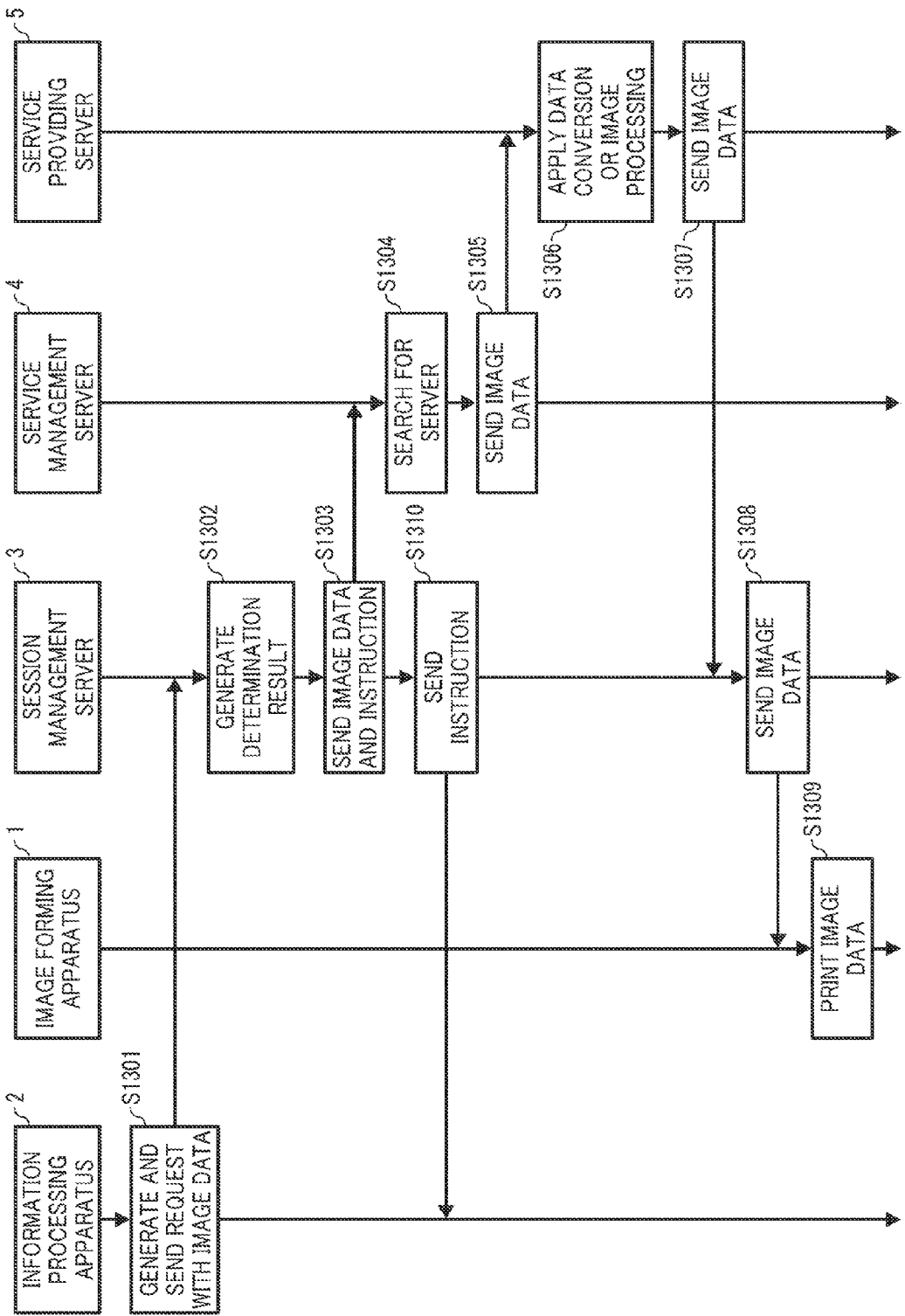
FIG. 13 is a data sequence diagram illustrating operation of processing a user request, according to an example embodiment of the present invention.

FIG. 13 illustrates an example case in which the image processing management apparatus 6 of the image processing system of FIG. 1 determines that the image forming apparatus 1 is not capable of interpreting the data format of the image data or not capable of applying the specific image processing to the image data. Further, in this example, it is assumed that the image data to be processed is sent to the session management server 3 together with the user request. Further, in this example, it is assumed that one device of the service providing server 5 is found to be capable of applying the data conversion or the specific image processing.

At S1301, the information processing apparatus 1 receives a user instruction for printing image data after applying image processing, generates a user request including an image processing request and an image forming request, and sends the user request to the session management server 3, in a substantially similar manner as described above referring to S1101, S1102, and S1103 of FIG. 11. In this example, as described above, it is assumed that the image data to be processed is sent together with the user request.

At S1302, the service manager 306 of the session management server 3 analyzes the user request to generate a determination result indicating how the image processing system of FIG. 1 should process the user request, in a substantially similar manner as described above referring to S1104 of FIG. 11. In this example, it is assumed that the determination result indicates that the data format is not interpretable by the image forming apparatus 1 or the specific image processing cannot be applied by the image forming apparatus 1.

At S1303, the session manager 302 sends the image data obtained at S1301 to the service management server 4 through the network I/F 303. Together with the image data, the session manager 302 sends an instruction generated by the service manager 306 based on the determination result obtained at S1302. In this example, the instruction may request the service management server 4 to perform data conversion to convert the data format of the image data to a data format that is interpretable by the image forming apparatus 1, when the determination result at S1302 indicates that the data format is not interpretable by the image forming apparatus 1. Additionally or alternatively, the instruction may request the service management server 4 to apply the specific image processing, when the determination result at S1302 indicates that the specific image processing cannot be applied by the image forming apparatus 1.

When the service management server 4 receives the instruction and the image data to be processed through the network I/F 403, at S1304, the service management server 4 may search through the service providing server 5 to find a device that is capable of applying data conversion specified by the instruction. For example, under control of the main controller 401, the service manager 402 may analyze the instruction, and search for a device of the service providing server 5 that is capable of converting the data format to the data format interpretable by the image forming apparatus 1 by referring to the service provider information DB 404. Additionally or alternatively, the service manager 402 may analyze the instruction, and search through the service providing server 5 to obtain a device that is capable of applying the specific image processing to the image data.

When the service manager 402 finds the service providing server 5 capable of applying data conversion or image processing, at S1305, the main controller 401 sends the image data to be processed to the service providing server 5 being searched through the network I/F 403, together with the instruction for applying specific data conversion or image processing.

When the image data and the instruction are received by the service providing server 5 through the network I/F 503, at S1306, under control of the main controller 501, the service provider 502 may apply data conversion to the image data according to the instruction. Additionally or alternatively, the service provider 502 may apply specific image processing to the image data according to the instruction. As a result, the processed image data having the data format interpretable by the image forming apparatus 1 is generated.

At S1307, the main controller 501 sends the processed image data generated at S1306 to the session management server 3 through the network I/F 503.

When the processed image data is received by the session management server 3 through the network I/F 303, at S1308, the main controller 301 sends the processed image data to the image forming apparatus 1 through the network I/F 303 together with an instruction to print the processed image data.

At S1309, the main controller 111 of the image forming apparatus 1 causes the image processor 114 to apply further image processing to the processed image data to generate print data. The main controller 111 further causes the engine controller 112 to print the print data, and the operation ends.

Figure 15:
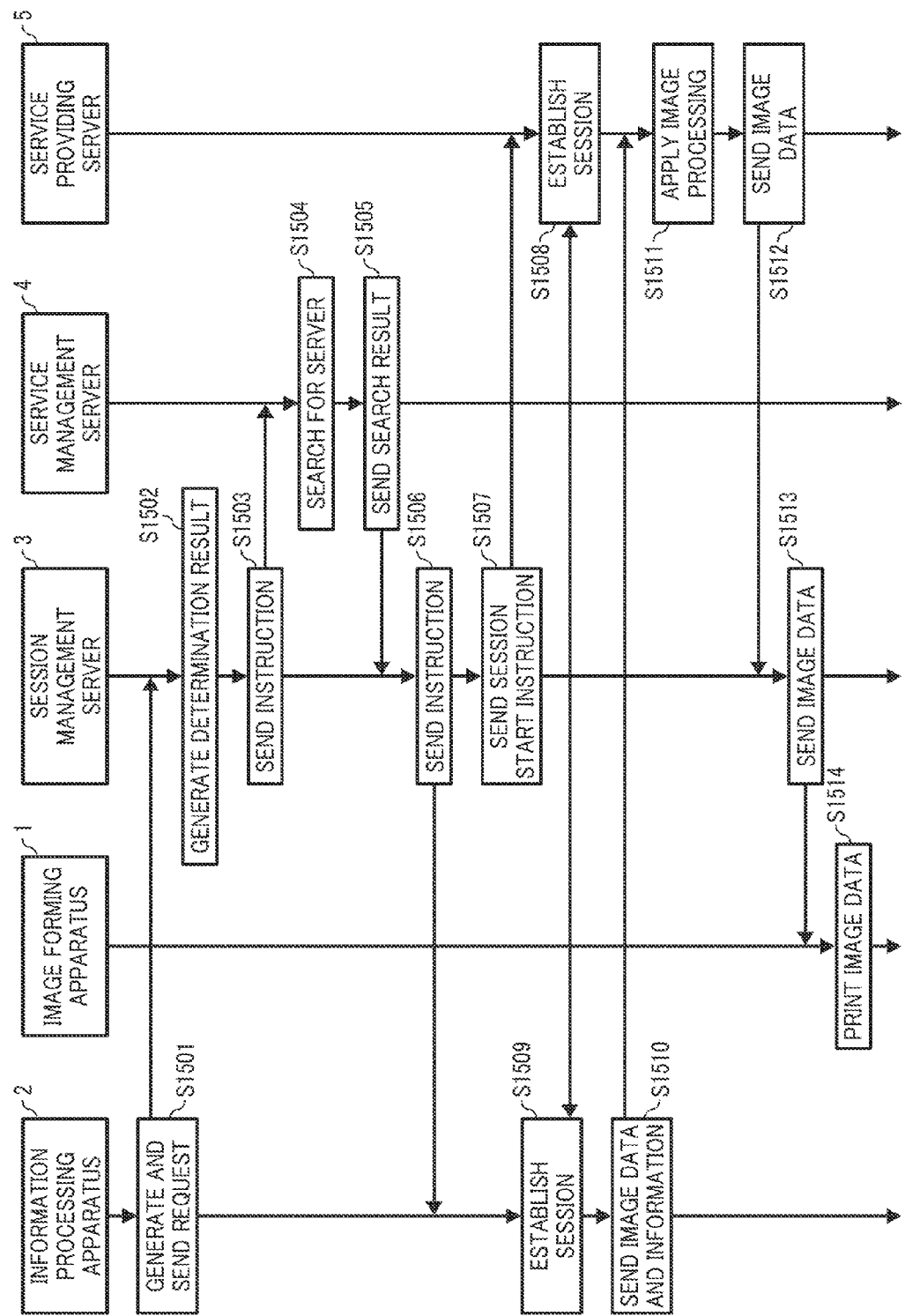
FIG. 15 is a data sequence diagram illustrating operation of processing a user request, according to an example embodiment of the present invention.

FIG. 15 illustrates an example case in which the image processing management apparatus 6 of the image processing system of FIG. 1 determines that the image forming apparatus 1 is not capable of interpreting the data format of the image data or not capable of applying the specific image processing to the image data. Further, in this example, it is assumed that the user request is sent to the session management server 3 without the image data to be processed. Further, in this example, one device of the service providing server 5 is found to be capable of applying the data conversion or the specific image processing.

At S1501, the information processing apparatus 1 receives a user instruction for printing image data after applying image processing, generates a user request including an image processing request and an image forming request, and sends the user request to the session management server 3, in a substantially similar manner as described above referring to S1101, S1102, and S1103 of FIG. 11.

At S1502, the service manager 306 of the session management server 3 analyzes the user request to generate a determination result indicating how the image processing system of FIG. 1 should process the user request, in a substantially similar manner as described above referring to S1104 of FIG. 11. In this example, it is assumed that the determination result indicates that the data format is not interpretable by the image forming apparatus 1 or the specific image processing cannot be applied by the image forming apparatus 1.

At S1503, the session manager 302 sends an instruction generated based on the determination result obtained at S1502 to the service management server 4 through the network I/F 303 in a substantially similar manner as described above referring to S1303 of FIG. 13, however, without the image data to be processed.

When the service management server 4 receives the instruction through the network I/F 403, at S1504, the service management server 4 may search for the service providing server 5 capable of applying data conversion specified by the instruction or applying specific image processing specified by the instruction, in a substantially similar manner as described above referring to S1304 of FIG. 13.

When the service manager 402 finds the service providing server 5 capable of applying data conversion or image processing, at S1505, the main controller 401 of the service management server 4 sends a search result specifying the service providing server 5 capable of applying data conversion or image processing to the session management server 3 through the network I/F 403. The search result may include information regarding the service providing server 5 being found, such as address information or authentication information.

When the search result is received, at S1506, the session management server 3 sends an instruction generated based on the determination result of S1502 and the search result received from the service management server 4, to the information processing apparatus 2. For example, the instruction may indicate that the specific image processing cannot be applied by the image forming apparatus 2 but can be applied by the service providing server 5. The instruction may further request the information processing apparatus 2 to start a session with the service providing server 5. The instruction may further include the address information or the authentication information of the service providing server 5, which may be obtainable from the search result.

At S1507, the session management server 3 sends a session start instruction to the service providing server 5 being searched to request the service providing server 5 to start a session with the information processing apparatus 2. The instruction may include address information or authentication information of the information processing apparatus 2.

At S1508 and S1509, the information processing apparatus 2 and the service providing server 5 establish a session. In this example, the session may be established using the authentication information.

At S1510, the information processing apparatus 2 sends the image data to be processed and the image processing information to the service providing server 5.

When the image data and the image processing information are received, at S1511, the service providing server 5 applies the specific image processing specified by the image processing information of the image processing request to the image data to generate the processed image data.

At S1512, the service providing server 5 sends the processed image data to the session management server 3.

At S1513, the session management server 3 sends the processed image data to the image forming apparatus 1, together with an instruction to print the processed image data.

At S1514, the image forming apparatus 1 prints the image data in a substantially similar manner as described above referring to S1309 of FIG. 13, and the operation ends.

The operation of FIG. 13 or 15 may be performed in various other ways. For example, the data conversion or the specific image processing may be applied by more than one device of the service providing server 5. In one example, the data conversion may be applied by a first device of the service providing server 5, while the specific image processing may be applied by a second device of the service providing server 5. In another example, the specific image processing, which may be broken down into a plurality of image processing operations, may be applied by a plurality of devices of the service providing server 5.

Figure 32:
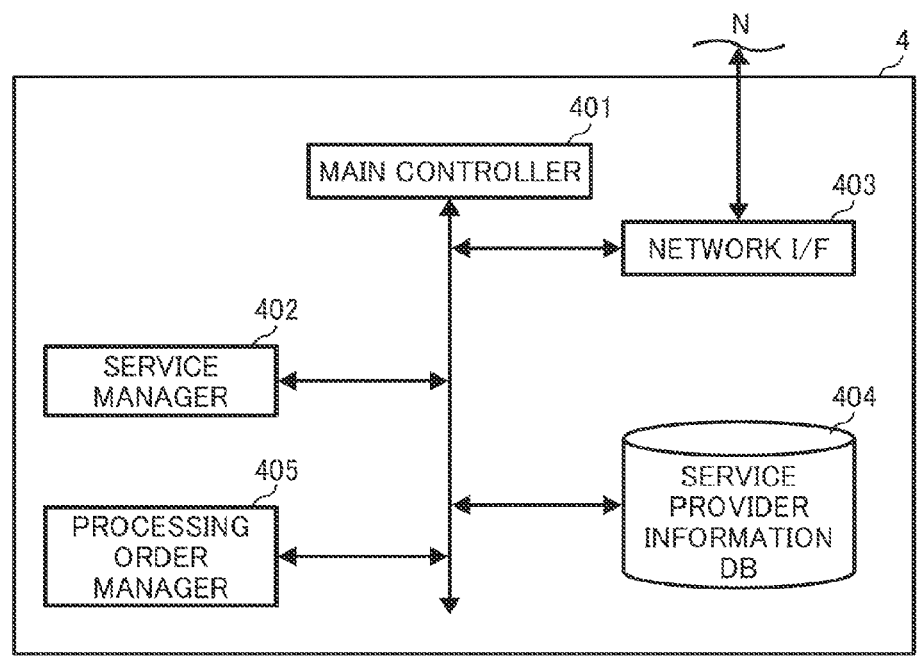
FIG. 32 is a schematic block diagram illustrating the structure of a service management server, according to an example embodiment of the present invention.

In such case, as illustrated in FIG. 32, the service management server 4 may be additionally provided with a processing order manager 405. The processing order manager 405 may determine an order of applying the plurality of image processing operations to generate a processing order determination result, for example, when the image processing is applied by a plurality of devices of the service providing server 5 each applying at least one of the plurality of image processing operations. The service manager 402 of the service management server 4 may generate an instruction based on the processing order determination result, and send the instruction to one device of the service providing server 5 according to the processing order determination result, to cause the service providing server 5 to apply the plurality of image processing operations in the order specified by the processing order determination result.

Figure 14:
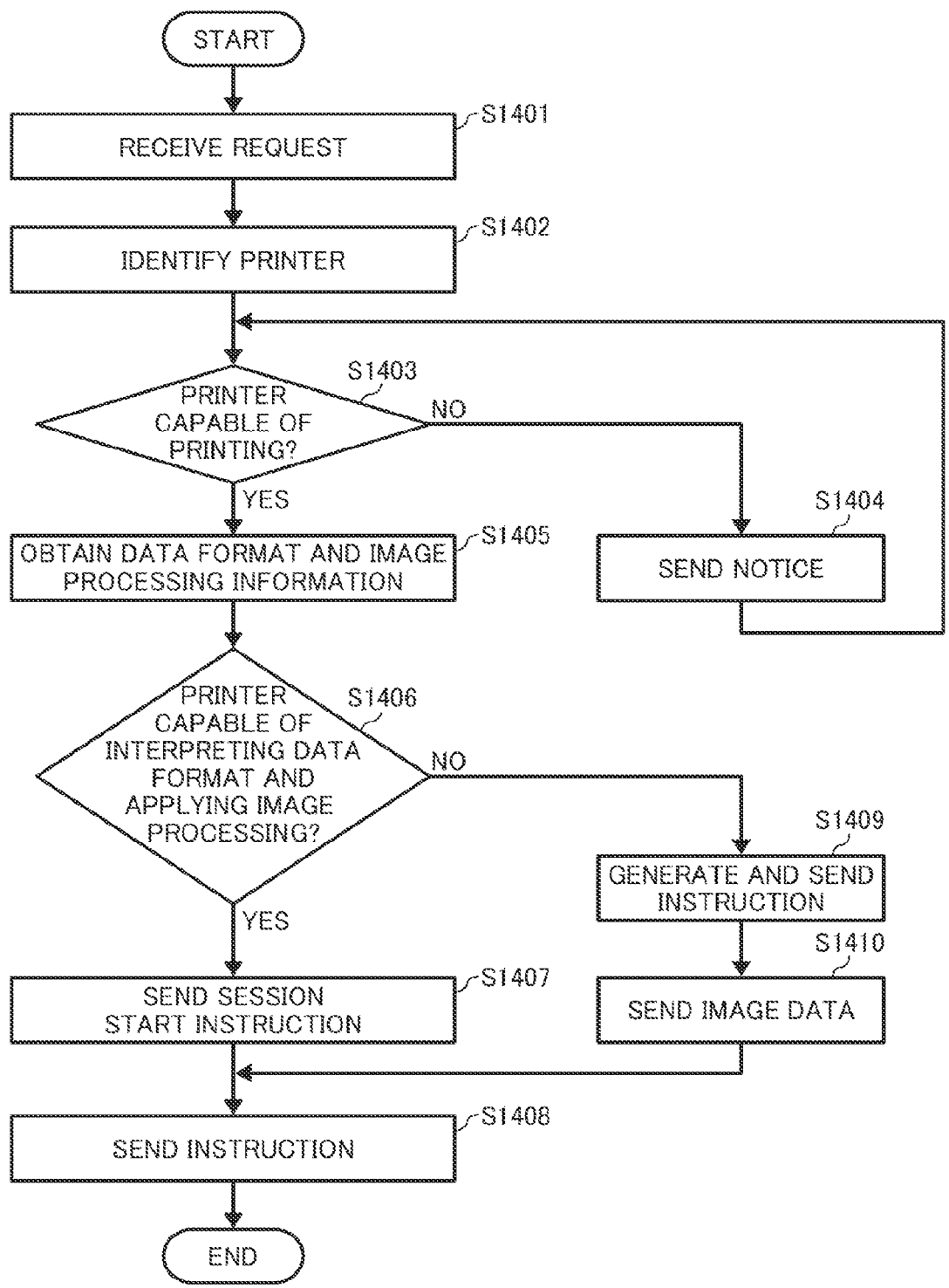
FIG. 14 is a flowchart illustrating operation of managing an image processing system, performed by the session management server of FIG. 1, according to an example embodiment of the present invention.

Referring now to FIG. 14, operation of managing the image processing system of FIG. 1, performed by the session management server 3, is explained according to an example embodiment of the present invention.

At S1401, the session manger 302 receives a user request from the information processing apparatus 2.

At S1402, the service manager 306 analyzes the user request to obtain printer information to identify a printer designated by the user to perform the image forming request. In this example, the image forming apparatus 1 is assumed to be designated.

At S1403, the service manager 306 obtains status information or supply information of the image forming apparatus 1, for example, by referring to the device information stored in the device information DB 304 to determine whether the image forming apparatus 1 is capable of performing image formation to generate a determination result. When the determination result at S1403 indicates that the image forming apparatus 1 is not capable of performing image formation ("NO" at S1403), the operation proceeds to S1404. When the determination result at S1403 indicates that the image forming apparatus 1 is capable of performing image formation ("YES" at S1403), the operation proceeds to S1405.

At S1404, the session manager 302 sends a notice to the information processing apparatus 2, which reports that the image forming apparatus 1 is not capable of performing image formation, through the network I/F 303. The notice may request the user to turn on the image forming apparatus 1 or replenish the printer supply of the image forming apparatus 1 based on the determination result obtained at S1403. After S1404, the operation returns to S1403.

At S1405, the service manager 306 analyzes the user request to obtain the data format of the image data to be processed and image processing to be applied to the image data.

At S1406, the service manager 306 determines whether the data format of the image data obtained at S1405 is interpretable by the image forming apparatus 1 and whether image processing obtained at S1405 can be applied by the image forming apparatus 1.

When it is determined that the data format is interpretable by the image forming apparatus 1 and the image processing can be applied by the image forming apparatus 1 ("YES" at S1406), the operation proceeds to S1407. When it is determined that the data format is not interpretable by the image forming apparatus 1 or the image processing cannot be applied by the image forming apparatus 1, the operation proceeds to S1409.

At S1407, the session manager 302 sends a session start instruction to the image forming apparatus 1 through the network I/F 303 to request the image forming apparatus 1 to start a session with the information processing apparatus 2.

At S1409, the service manager 306 may generate an instruction based on the determination result obtained at S1406. In this example, the instruction being generated requests the service management server 4 to apply data conversion that converts the data format of the image data to be processed to the data format interpretable by the image forming apparatus 1 when the determination result at S1406 indicates that the data format of the image data to be processed is not interpretable by the image forming apparatus 1. Alternatively or additionally, the instruction being generated requests the service management server 4 to apply image processing specified by the image processing information of the user request when the determination result at S1406 indicates that the image processing cannot be applied by the image forming apparatus 1. The session manager 302 may send the instruction to the service management server 4 through the network I/F 303 together with the image data to be processed.

At S1410, the session manager 302 receives the image data being processed by the service providing server 5, and sends the processed image data to the image forming apparatus 1.

At S1408, the session manager 302 sends an instruction generated based on the determination result obtained at S1406 to the information processing apparatus 2 through the network I/F 303, and the operation ends. In this example, when the determination result obtained at S1406 indicates that the image forming apparatus 1 is capable of interpreting the data format and applying image processing, the instruction being generated may request the information processing apparatus 2 to send the image data to be processed and the image processing information to the image forming apparatus 1. When the determination result obtained at S1406 indicates that the image forming apparatus 1 is not capable of interpreting the data format or applying image processing, the instruction being generated may notify the information processing apparatus 2 that the image data is being printed by the image forming apparatus 1 after being processed by the service providing server 5.

As described above referring to any one of FIGS. 13 to 15, the information processing apparatus 2 does not have to convert the data format of the image data to be the data format interpretable by the image forming apparatus 1, before sending the image data to the image forming apparatus 1. Since the information processing apparatus 2 does not need to perform data conversion, or the information processing apparatus 2 does not have to determine whether any data conversion is necessary, the printing controller 205 (FIG. 3) does not have to be provided with the function of performing data conversion. Accordingly, the printing controller 205 does not have to be upgraded or re-designed even when the image forming apparatus 1 is replaced with another image forming apparatus or even when the image processing system of FIG. 1 is additionally provided with one or more image forming apparatuses.

Further, the user is capable of requesting specific image processing, even when neither one of the image forming apparatus 1 and the information processing apparatus 2 is capable of applying the specific image processing. As long as at least one device that is capable of applying the specific image processing is provided on the network N, the user may request the specific image processing.

Further, even when image processing that the user desires to perform is not provided by the image processing system of FIG. 1, the system may be changed so as to provide such image processing function, for example, by adding the service providing server 5 capable of performing the requested image processing to the network B of the service provider. In such case, the user does not have to add another apparatus to the network A or does not have to change the settings of any apparatus provided on the network A.

Further, as described above referring to FIG. 13 and FIG. 15, for example, the information processing apparatus 2 does not have to send the image data to be processed until when it receives an instruction to send the image data to an apparatus specified by the image processing management apparatus 6, from the image processing management apparatus 6. This may reduce the overall network load of the system or the overall processing load of the apparatus on the network N. Further, since the image data is sent after the session is established, that is, preferably after the client and server apparatuses are authenticated, the image data may be protected from the access or attack from the unauthorized user.

Figure 25:
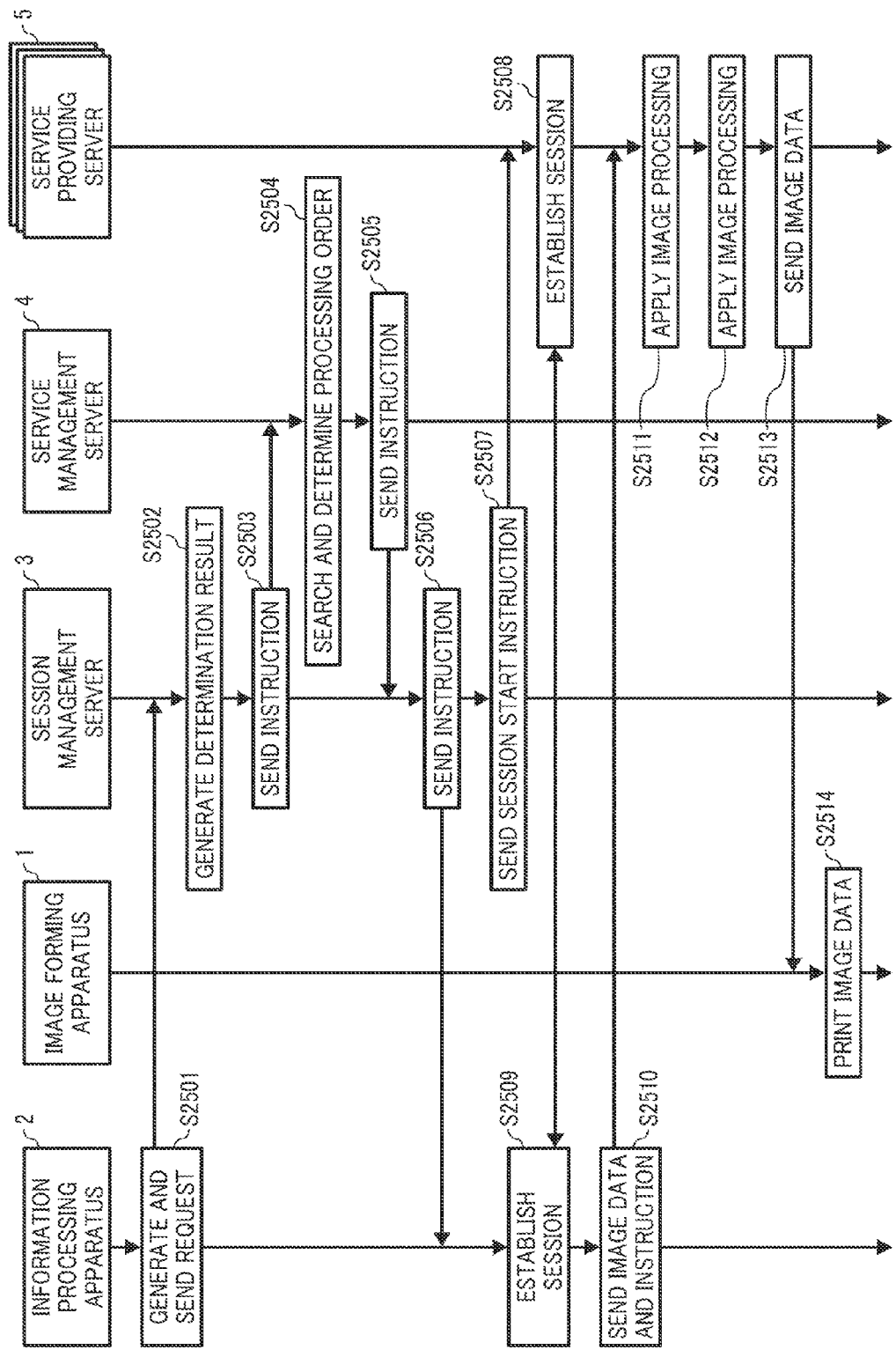
FIG. 25 is a data sequence diagram illustrating operation of processing a user request, according to an example embodiment of the present invention.

FIG. 25 illustrates an example case in which the image processing management apparatus 6 of the image processing system of FIG. 1 determines that the image forming apparatus 1 is capable of interpreting the data format of the image data but not capable of applying the image processing to the image data. Further, the specific image processing may include a plurality of image processing operations. Further, in this example, it is assumed that a plurality of devices of the service providing server 5 are found to be capable of together applying the plurality of image processing operations of the specific image processing. Further, as described above referring to FIG. 32, the image processing management apparatus 6 is provided with the processing order manager 405, which determines an order of applying the plurality of image processing operations.

At S2501, the information processing apparatus 2 receives a user instruction for printing image data after applying image processing, generates a user request including an image processing request and an image forming request, and sends the user request to the session management server 3. In this example, the image data to be processed is not sent.

At S2502, the service manager 306 of the session management server 3 analyzes the user request to generate a determination result indicating how the image processing system of FIG. 1 should process the user request. In this example, it is assumed that the determination result indicates that the data format is interpretable by the image forming apparatus 1 but the specific image processing cannot be applied by the image forming apparatus 1.

At S2503, the session manager 302 sends an instruction generated based on the determination result obtained at S2502 to the service management server 4 through the network I/F 303. The instruction may request the service management server 4 to apply a plurality of image processing operations of the specific image processing.

When the service management server 4 receives the instruction through the network I/F 403, at S2504, the service management server 4 may search for the service providing server 5 capable of applying specific image processing specified by the instruction. In this example, the search result indicates that a plurality of devices of the service providing server 5 are capable of together applying the plurality of image processing operations of the specific image processing.

Further, at S2504, the processing order manager 405 (FIG. 32) of the service management server 4 determines an order of applying the plurality of image processing operations to generate a processing order determination result. The service manager 402 of the service management server 4 generates an instruction based on the processing order determination result. Specifically, in this example, the instruction may include route information regarding a route of which the image data to be processed is transferred from device to device of the service providing server 5. The instruction may further include address information or authentication information of each device of the service providing server 5, which is found to be capable of applying at least one of the plurality of image processing operations.

At S2505, the service management server 4 sends the instruction being generated at S2504 to the session management server 3.

When the instruction is received from the service management server 4, at S2506, the session management server 3 sends an instruction to the information processing apparatus 2. In this example, the instruction at least includes the route information.

At S2507, the session management server 3 sends a session start instruction to a first device of the service providing server 5, which requests the first device to start a session with the information processing apparatus 2. In this example, the first device is the device, which is determined by the service management server 4 to firstly apply the image processing operation.

At S2508 and S2509, the information processing apparatus 2 and the first device of the service providing server 5 establish a session. In this example, the session may be established using the authentication information.

At S2510, the information processing apparatus 2 sends the image data to be processed and an instruction including the image processing information, to the first device of the service providing server 5. The instruction further includes the route information regarding the route of which the image data to be processed is transferred from device to device of the service providing server 5.

When the image data and the instruction are received, at S2511, the first device of the service providing server 5 applies the specific image processing specified by the instruction to the image data to generate the processed image data.

At S2511, after applying image processing, the first device of the service providing server 5 may refer to the route information to obtain information regarding a second device of the service providing server 5 that is determined to secondly apply the image processing operation. The first device of the service providing server 5 sends the processed image data and the instruction including the image processing information and the route information, to the second device of the service providing server 5. In this example, the first device of the service providing server 5 and the second device of the service providing server 5 establish a session under control of the session management server 3.

When the image data and the instruction are received, at S2512, the second device of the service providing server 5 applies the image processing according to the instruction. After applying image processing, the second device of the service providing server 5 may refer to the route information to obtain information regarding a third device of the service providing server 5 that is determined to subsequently apply the image processing operation, if any. When there is the third device to apply further image processing, the second device of the service providing server 5 sends the image data and the instruction to the third device of the service providing server 5. This process described above referring to S2511 or S2512 may be repeated until all image processing operations are processed by all devices being found.

When all image processing operations are processed, at S2513, the device of the service providing server 5 sends the processed image data to the image forming apparatus 1. In this example, the device of the service providing server 5 and the image forming apparatus 1 may establish a session under control of the session management server 3. After establishing the session, the image data is transferred from the service providing server 5 to the image forming apparatus 1 through a data channel.

When the processed image data is received, at S2514, the image forming apparatus 1 prints the processed image data, and the operation ends.

Figure 26:
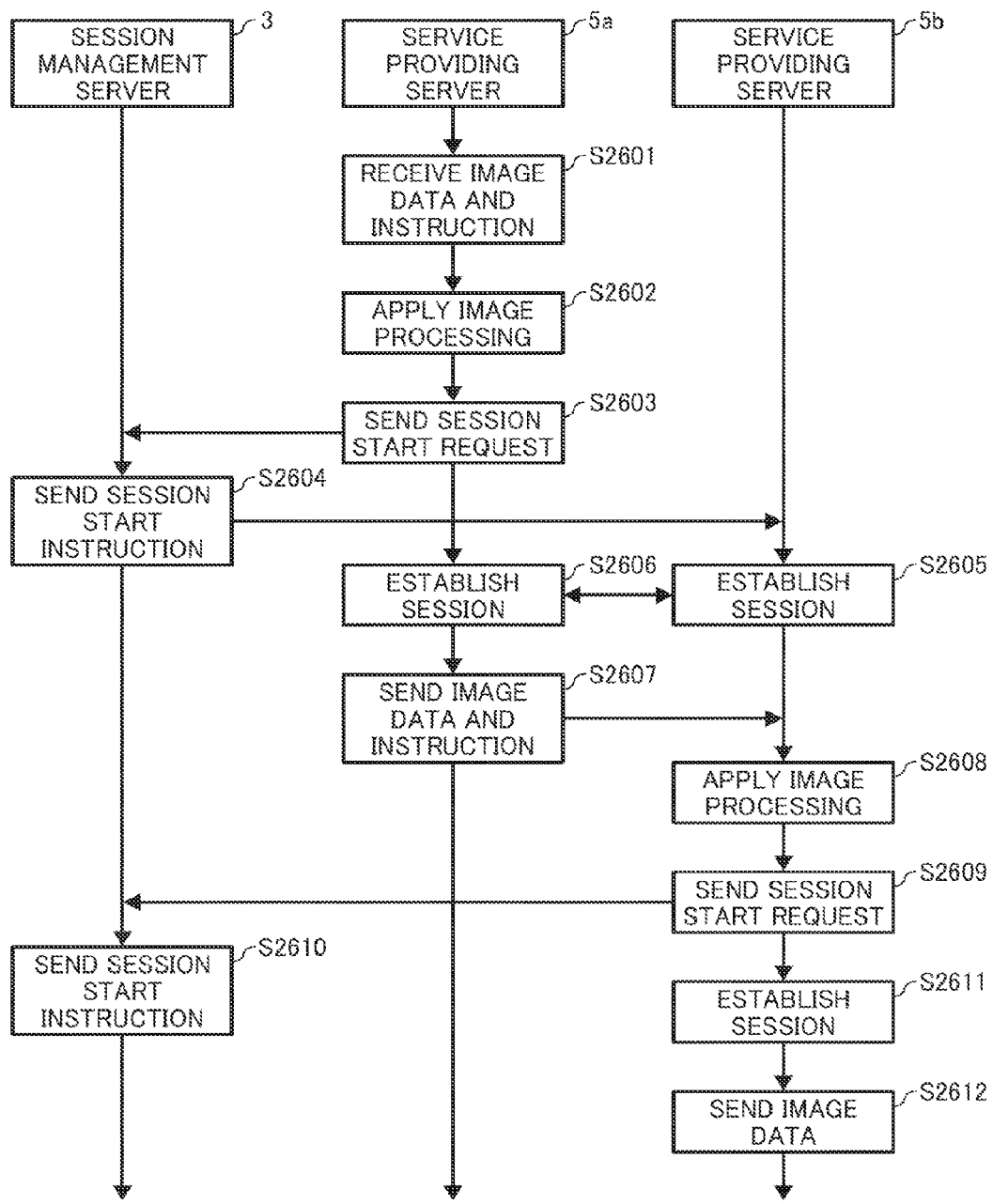
FIG. 26 is a data sequence diagram illustrating operation of managing image processing based on route information, according to an example embodiment of the present invention.

Referring now to FIG. 26, operation of managing image processing performed by the service management server 3 based on the route information, is explained according to an example embodiment of the present invention. For the descriptive purpose, in this example, it is assumed that the first device 5a of the service providing server 5 ("service providing server 5a") and the second device 5b of the service providing server 5 ("service providing server 5b") are assumed to apply the image processing to generate the processed image data. Further, in this example, the route information indicates that the image data should be transferred in the order of the first device 5a and the second device 5b. The operation of FIG. 26 may correspond to S2510 to S2513 of FIG. 25.

At 2601, the first device 5a of the service providing server 5 receives the image data and the instruction, which are sent from the information processing apparatus 1 at S2510 of FIG. 25. The instruction includes the image processing information and the route information.

At S2602, the first device 5a of the service providing server 5 applies image processing to the image data according to the image processing information of the instruction.

At S2603, the first device 5a of the service providing server 5 refers to the route information, and sends a session start request to the session management server 3, which requests starting of a session with the second device 5a of the service providing server 5 to which the processed image data and the instruction should be sent.

When the session start request is received, at S2604, the session management server 3 sends a session start instruction to the second device 5b of the service providing server 5, which requests starting of a session with the first device 5a.

At S2605 and S2606, the first device 5a and the second device 5b of the service providing server 5 establish a session.

When the session is established, at S2607, the first device 5a of the service providing server 5 sends the processed image data and the instruction to the second device 5b of the service providing server 5.

When the image data and the instruction are received, at S2608, the second device 5b of the service providing server 5 applies the image processing to the image data according to the image processing information of the instruction.

At S2609, the second device 5b of the service providing server 5 refers to the route information, and sends a session start request to the session management server 3, which requests starting of a session with the image forming apparatus 1.

When the session start request is received, at S2610, the session management server 3 sends a session start instruction to the image forming apparatus 1.

At S2611, the second device 5b of the service providing server 5 establishes a session with the image forming apparatus 1.

When the session is established, at S2612, the second device 5b of the service providing server 5 sends the processed image data to the image forming apparatus 1.

The operation of FIG. 26 may be performed in various other ways. For example, after completing image processing, for example, at S2603 or S2609, the service providing server 5 may send a notice to the session management server 3, which reports completion of the image processing. When the notice is received, the session management server 3 may refer to the route information, and send an instruction to the device that is determined to subsequently apply image processing to cause the device to apply image processing.

Figure 27:
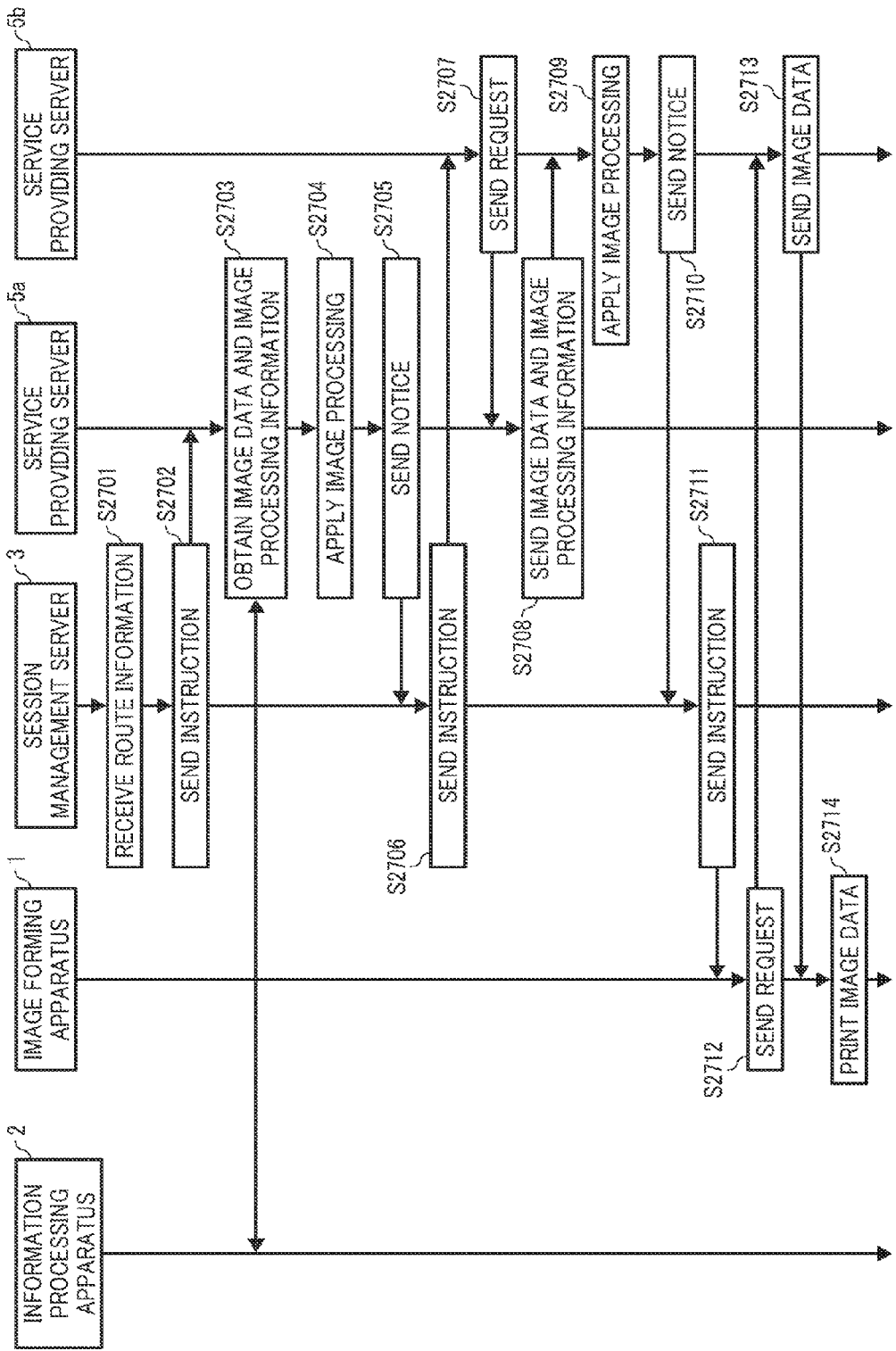
FIG. 27 is a data sequence diagram illustrating operation of managing image processing based on route information, according to an example embodiment of the present invention.

Referring to FIG. 27, operation of managing image processing performed by the service management server 3 based on the route information, is explained according to an example embodiment of the present invention. For the descriptive purpose, in this example, it is assumed that the first device 5a of the service providing server 5 and the second device 5b of the service providing server 5 are assumed to apply the image processing to generate the processed image data. Further, in this example, the route information indicates that the image data should be transferred in the order of the first device 5a and the second device 5b. The operation of FIG. 27 may correspond to S2506 to S2514 of FIG. 25.

At S2701, the session management server 3 receives the route information from the service management server 4.

At S2702, the session management server 3 generates an instruction based on the route information, and sends the instruction to the first device 5a of the service providing server 5. In this example, the instruction requests the first device 5a of the service providing server 5 to obtain the image data to be processed and the image processing information from the information processing apparatus 2. Specifically, in this example, the instruction includes information regarding the location where the image data and the image processing information are stored, which may be expressed as URL.

When the instruction is received from the session service manager 3, at S2703, the first device 5a of the service providing server 5 obtains the image data and the image processing information from the information processing apparatus 2 based on the instruction.

When the image data and the image processing information are obtained, at S2704, the first device 5*a* of the service providing server 5 applies the image processing specified by the image processing information to the image data.

At S2705, the first device 5*a* of the service providing server 5 sends a notice to the session management server 3 that image processing is completed.

When the notice is received from the first device 5*a* of the service providing server 5, at S2706, the session management server 3 refers to the route information, and sends an instruction to the second device 5*b* of the service providing server 5. In this example, the instruction may request the second device 5*b* of the service providing server 5 to obtain the image data to be processed and the image processing information from the first device 5*a* of the service providing server 5. Specifically, in this example, the instruction includes information regarding the location where the image data and the image processing information are stored, which may be expressed as URL.

When the instruction is received, at S2707, the second device 5*b* of the service providing server 5 sends a request to the first device 5*a* of the service providing server 5 for the image data and the image processing information.

When the request is received, at S2708, the first device 5*a* of the service providing server 5 sends the image data and the image processing information.

When the image data and the image processing information are obtained, at S2709, the second device 5*b* of the service providing server 5 applies the image processing to the image data according to the image processing information.

At S2710, the second device 5*b* of the service providing server 5 sends a notice to the session management server 3 that the image processing is completed.

At S2711, the session management server 3 refers to the route information, and sends an instruction to the image forming apparatus 1 that is designated to output the processed image data. The instruction may request the image forming apparatus 1 to obtain the processed image data from the second device 5*b* of the service providing server 5. The instruction may include information regarding the location where the processed image data is stored.

At S2712, the image forming apparatus 1 sends a request to the second device 5*b* of the service providing server 5, which requests for the processed image data.

At S2713, the second device 5*b* of the service providing server 5 sends the processed image data to the image forming apparatus 1.

At S2714, the image forming apparatus 1 prints the processed image data, and the operation ends.

In this example described above referring to FIG. 27, any information such as the image data may be transferred while being encrypted. For example, at S2704, the first device 5*a* of the service providing server 5 may encrypt the processed image data with the encrypted key. When sending the notice at S2705, the first device 5*a* of the service providing server 5 may send the encrypted key information. Further, at S2706, the session management server 3 sends the encrypted key information being obtained from the first device 5*a* of the service providing server 5, to the second device 5*b* of the service providing server 5. At S2707 and 2708, the second device 5*b* of the service providing server 5 obtains the image data using the encrypted key information being obtained from the session managements server 3. For improved security, S2703, S2712, or S2713 may be performed in a substantially similar manner using the encrypted key information.

Figure 16:
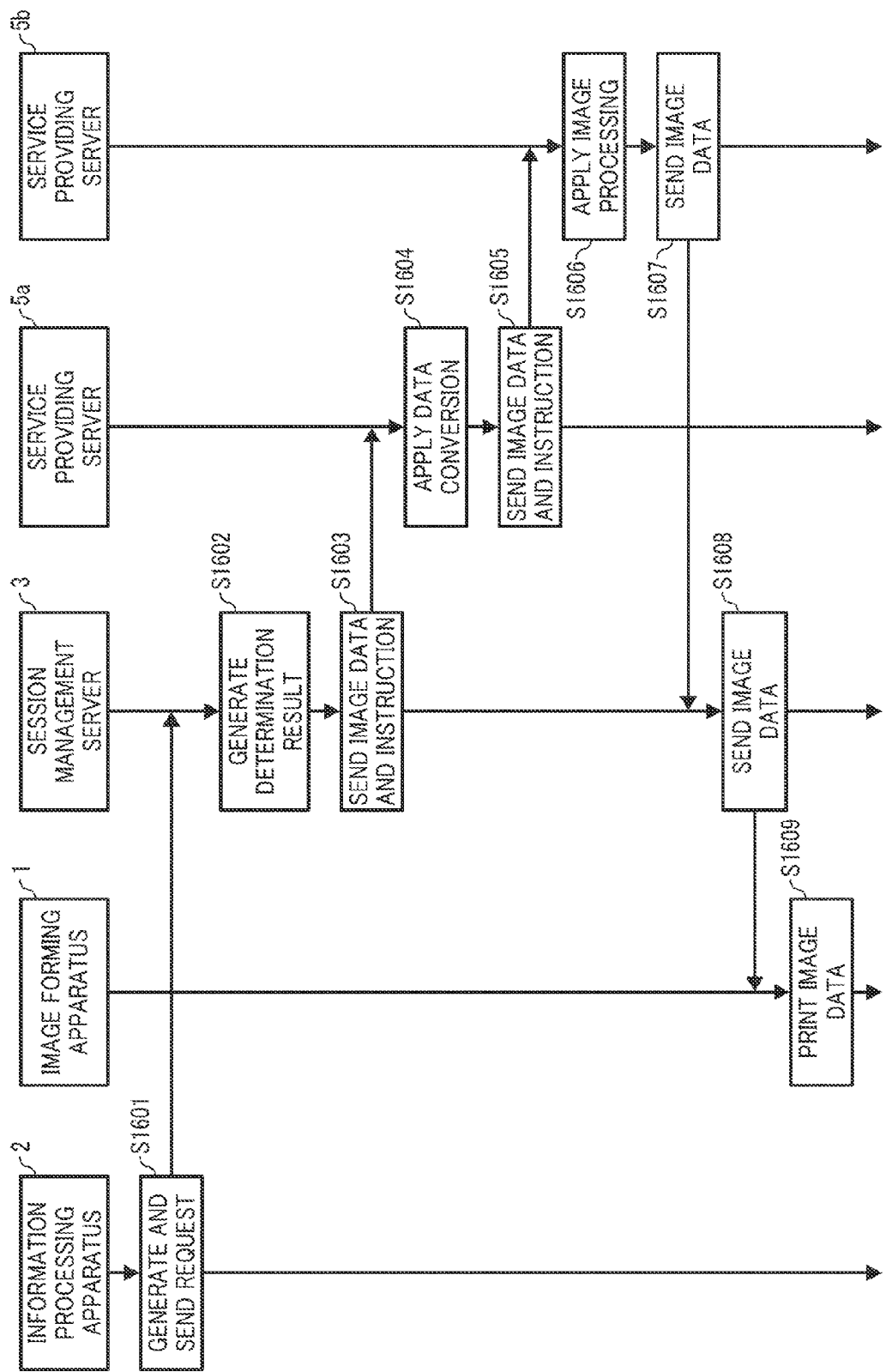
FIG. 16 is a data sequence diagram illustrating operation of processing a user request, according to an example embodiment of the present invention.
Figure 17:
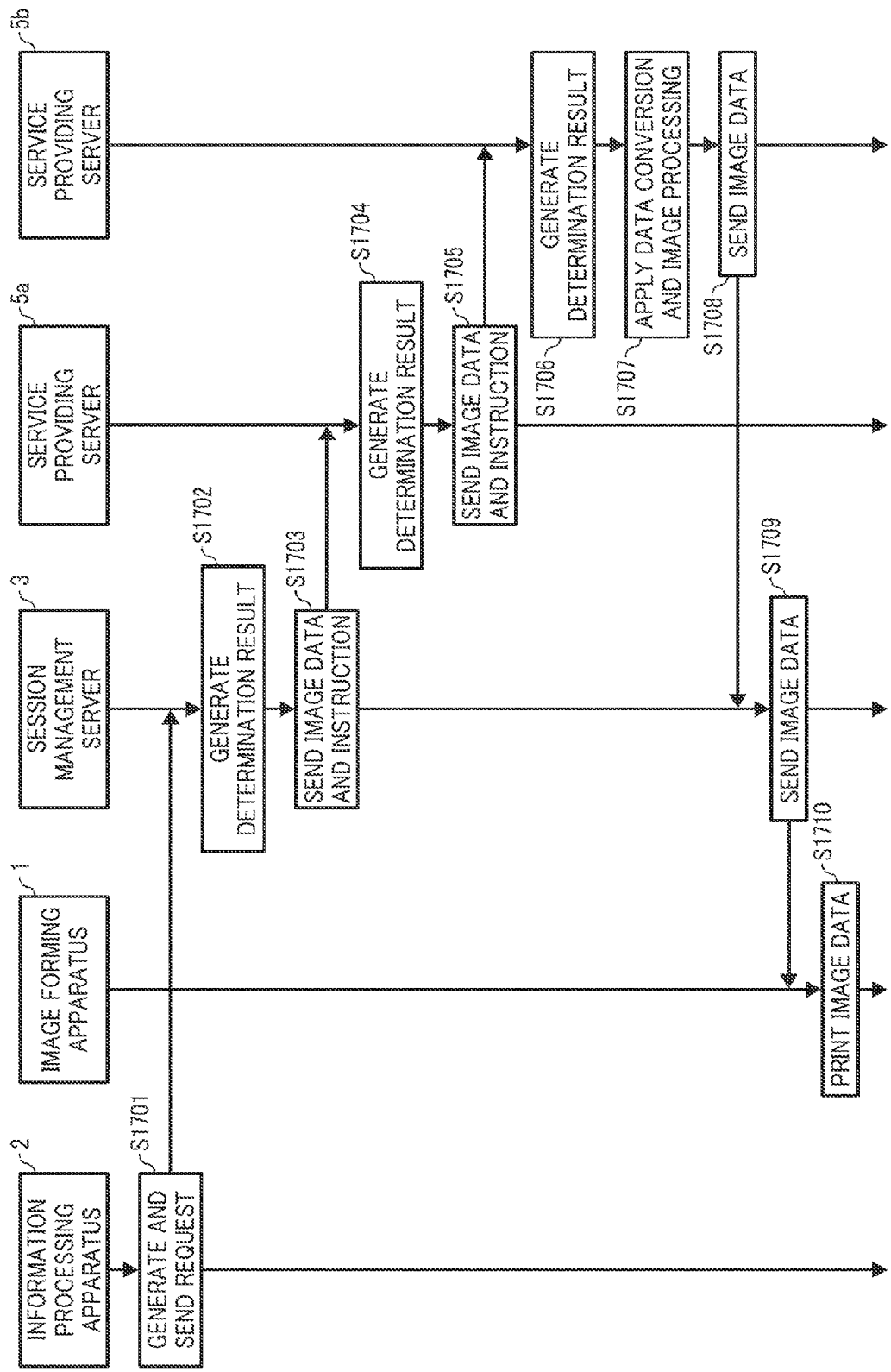
FIG. 17 is a data sequence diagram illustrating operation of processing a user request, according to an example embodiment of the present invention.

As described above referring to FIG. 1, the image processing management apparatus 6 may be implemented in various other ways. Referring now to FIGS. 16 and 17, an example case in which the image processing management apparatus 6 is implemented by the session management server 3 shown in FIG. 6 is explained. However, in this example, it is assumed that the device information DB 304 (FIG. 6) additionally stores device information regarding the service providing server 5, such as the device information illustrated in FIG. 9.

FIG. 16 illustrates an example case in which the image processing management apparatus 6 determines that the image forming apparatus 1 is not capable of interpreting the data format of the image data and not capable of applying the image processing to the image data. Further, in this example, it is assumed that a first device 5*a* (the "service providing server 5*a*") and a second device 5*b* (the "service providing server 5*b*") of the service providing server 5 are found to be capable of respectively applying the data conversion and the specific image processing.

At S1601, the information processing apparatus 2 receives a user instruction for printing image data after applying image processing, generates a user request including an image processing request and an image forming request, and sends the user request to the session management server 3, in a substantially similar manner as described above referring to S1101, S1102, and S1103 of FIG. 11. In this example, it is assumed that the image data to be processed is sent together with the user request.

At S1602, the service manager 306 of the session management server 3 analyzes the user request to generate a determination result indicating how the image processing system of FIG. 1 should process the user request, in a substantially similar manner as described above referring to S1104 of FIG. 11. In this example, it is assumed that the determination result indicates that the data format is not interpretable by the image forming apparatus 1 and the specific image processing cannot be applied by the image forming apparatus 1.

At S1603, the service manager 306 searches through the service providing server 5 to find a device that is capable of applying data conversion and a device that is capable of applying image processing, in a substantially similar manner as described above referring to S1304 of FIG. 13. In this example, the search result indicates that the first device 5*a* of the service providing server 5 is capable of applying data conversion, and the second device 5*b* of the service providing server 5 is capable of applying image processing. Based on the search result, the service manager 306 may generate an instruction, which requests the service providing server 5 to apply the data conversion and the image processing. The instruction may include information regarding the device being found, such as the first device 5*a* and the second device 5*b* of the service providing server 5. The instruction may additionally include route information regarding the order in which the image data and the instruction are transferred from device to device. The route information may be previously determined by default. Alternatively, the route information may be determined based on the status information of the service providing server 5, which may be obtainable from the device information when searching through the service providing server 5.

Further, at S1603, the service manager 306 sends the image data to be processed to the first device 5*a* of the service providing server 5, together with the instruction being generated based on the search result. In this example, the service manager 306 may arbitrarily determine a device to which the image data and the instruction are sent. Alternatively, the device to which the image data and the instruction are sent may be previously set based on the route information.

At S1604, the first device 5a of the service providing server 5 applies the data conversion to the image data according to the instruction.

At S1605, the first device 5a of the service providing server 5 sends the processed image data and the instruction to the second device 5a of the service providing server 5. The instruction may be updated by the first device 5a of the service providing server 5 so as to indicate that the data conversion is completed or the image data is processed by the first device 5a of the service providing server 5.

At S1606, the second device 5b of the service providing server 5 applies the image processing to the processed image data being received from the first device 5a of the service providing server 5 according to the instruction.

At S1607, the second device 5b of the service providing server 5 sends the processed image data to the session management server 3. In order to determine whether to send the processed image data to the session management server 3, the second device 5b of the service providing server 5 may determine whether the data conversion and the image processing, which are specified by the instruction, are completed by referring to the contents of the instruction that may be updated as it is transferred from device to device of the service providing server 5.

At S1608, the session management server 3 sends the processed image data to the image forming apparatus 1.

At S1609, the image forming apparatus 1 prints the image data, and the operation ends.

FIG. 17 illustrates an example case in which the image processing management apparatus 6 determines that the image forming apparatus 1 is not capable of interpreting the data format of the image data and not capable of applying the image processing to the image data. Further, in this example, it is assumed that the second device 5b (the "service providing server 5b") of the service providing server 5 is found to be capable of respectively applying the data conversion and the specific image processing.

S1701 to S1703 are performed in a substantially similar manner as described above referring to S1601 to S1603. However, in this example, the instruction being generated at S1703 is provided with the data format information and the image processing information, but not provided with information regarding the search result or information generated based on the search result. Further, in this example, it is assumed that the image data and the instruction are sent from device to device of the service providing server 5 until all image processing operations are performed on the image data. The route of which the image data and instruction are transferred may be set by default or determined based on the status information of each device of the service providing server 5.

When the image data and the instruction are received, at S1704, the first device 5a of the service providing server 5 determines whether it is necessary to apply data conversion or image processing to the image data, for example, by comparing the image processing function that the first device 5a of the service providing server 5 can offer with the image processing specified by the instruction. In this example, it is assumed that there is no data conversion or image processing that the first device 5a of the service providing server 5 can provide.

In such case, at S1705, the first device 5a of the service providing server 5 sends the image data, without processing, to the second device 5b of the service providing server 5 together with the instruction. The instruction may be updated so as to indicate that the image data and the instruction are sent to the first device 5a of the service providing server 5 or no image processing is applied to the image data.

When the image data and the instruction are received, at S1706, the second device 5b of the service providing server 5 determines whether it is necessary to apply data conversion or image processing to the image data, for example, by comparing the image processing function that the second device 5b of the service providing server 5 can offer with the image processing specified by the instruction. In this example, it is assumed that the data conversion and the image processing specified by the instruction can be applied by the second device 5b of the service providing server 5.

At S1707, the second device 5b of the service providing server 5 applies the data conversion and the image processing to the image data being received from the first device 5a of the service providing server 5 to generate the processed image data.

At S1708, the second device 5b of the service providing server 5 sends the processed image data to the session management server 3. In order to determine whether to send the processed image data to the session management server 3, the second device 5b of the service providing server 5 may determine whether the data conversion and the image processing, which are specified by the instruction, are completed by referring to the contents of the instruction that may be updated as it is transferred from device to device of the service providing server 5.

At S1709, the session management server 3 sends the processed image data to the image forming apparatus 1.

At S1710, the image forming apparatus 1 prints the image data, and the operation ends.

The image processing operation described above referring to FIGS. 11 to 17, 25, 26, and 27 may be performed in various other ways.

For example, rather than determining whether the image forming apparatus 1 is capable of applying data conversion or image processing, the session management server 3 may pass the user request, which may be provided with the image data, to the service management server 4. In such case, the service manager 306 does not have to be provided.

In another example, the image forming request does not have to be provided with the printer information, for example, when the user instruction does not specify the image forming apparatus. In such case, when the user request is received from the information processing apparatus 2, the session management server 3 may select the image forming apparatus by default or based on the other information of the user request. For example, the session management server 3 may obtain the data format information from the user request, or obtain the data format information from the image data file. Based on the data format, the session management server 3 may select one of the image forming apparatuses, for example, by referring to the device information DB 304.

In such case, when a plurality of image forming apparatuses are available, the session management server 3 may request the user at the information processing apparatus 2 to select one of the plurality of image forming apparatuses. For example, at least one of the session management server 3, the service management server 4, and the service providing server 5 may send the processed image data to which the image processing is applied to the information processing apparatus 2. The information processing apparatus 2 may send the selected one of the image forming apparatuses to complete image formation.

Alternatively, at least one of the session management server 3, the service management server 4, and the service providing server 5 may provide the information processing apparatus 2 with data location information regarding the location where the processed image data is stored. When the data location information is received, the information processing apparatus 2 may obtain the processed image data using the data location information. Alternatively, the information processing apparatus 2 may request the image forming apparatus 1 to obtain the processed image data, by sending the data location information. Alternatively, once the data location information is obtained, the information processing apparatus 2 may cause the user I/F 204 to display the data location information to the user. The user may directly operate the image forming apparatus 1 through the operation panel 104 to cause the image forming apparatus 1 to print the processed image data. Since the operation of image forming is started only when instructed by the user, the user may instruct the image forming apparatus 1 to process a plurality of printing jobs at once such that the user is only required to go to the image forming apparatus 1 for once. This may further prevent the printed document to be left on the output tray 107 as the user is most likely to pick up the printed document after the user instructs for image forming, thus protecting the printed document from being lost or stolen.

Figure 18:
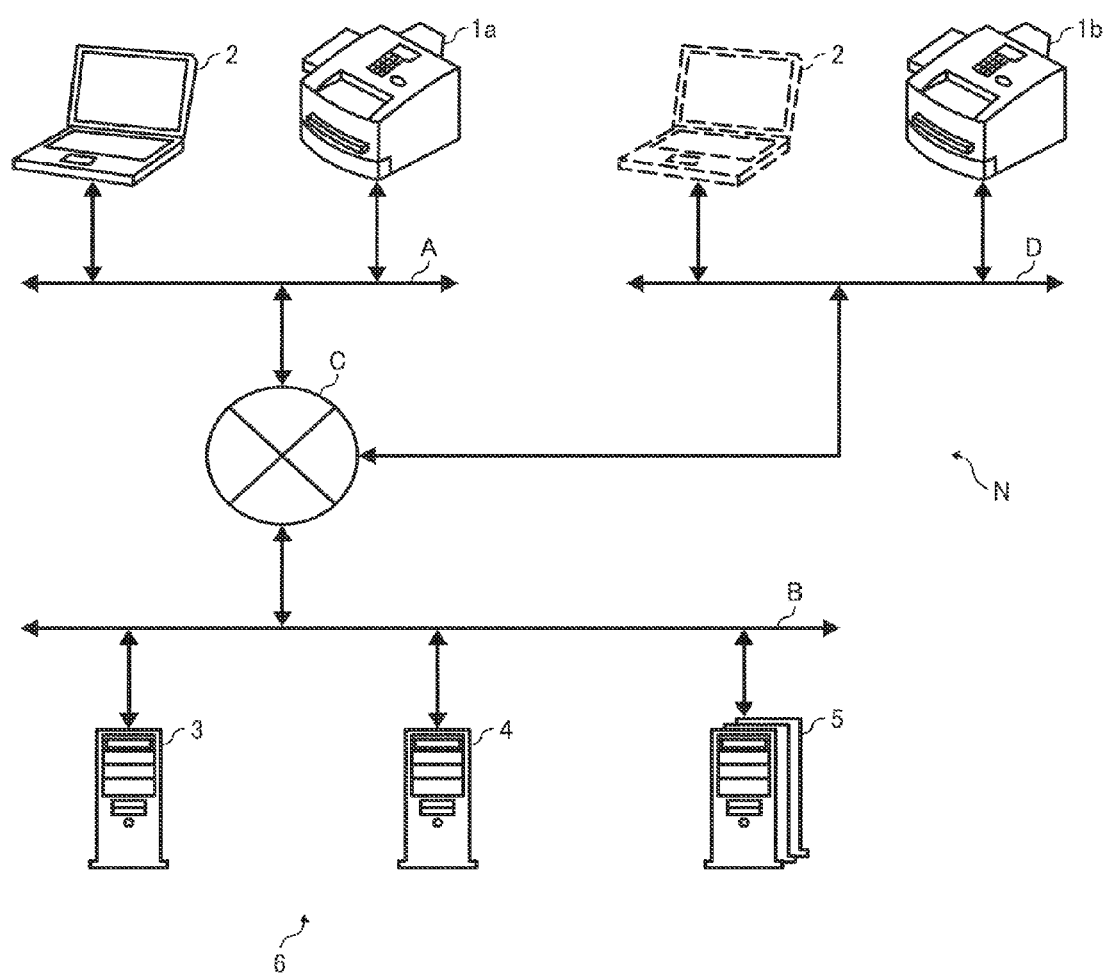
FIG. 18 is an illustration for explaining a configuration of an image processing system according to an example embodiment of the present invention.

Referring now to FIG. 18, a configuration of an image processing system is explained according to an example embodiment of the present invention. The image processing system of FIG. 18 is substantially similar to the image processing system of FIG. 1. The differences include the addition of a network D provided with an image forming apparatus 1b. The network D may be a local area network. Specifically, in this example, it is assumed that the user using the information processing apparatus 2 moves to another location away from the location where the network A is provided. In such case, the information processing apparatus 2, which is usually connected to the network A, may be connected to the network D.

Even when the information processing apparatus 2 connects to the network C through the network D, operation of image processing or image forming may be performed in a substantially similar manner as described above referring to FIGS. 11 to 17, and 25 to 27. However, in the example case illustrated in FIG. 18, the user request generated by the information processing apparatus 2 may specify the image forming apparatus 1b as the image forming apparatus 1 to print the image data.

Figure 19:
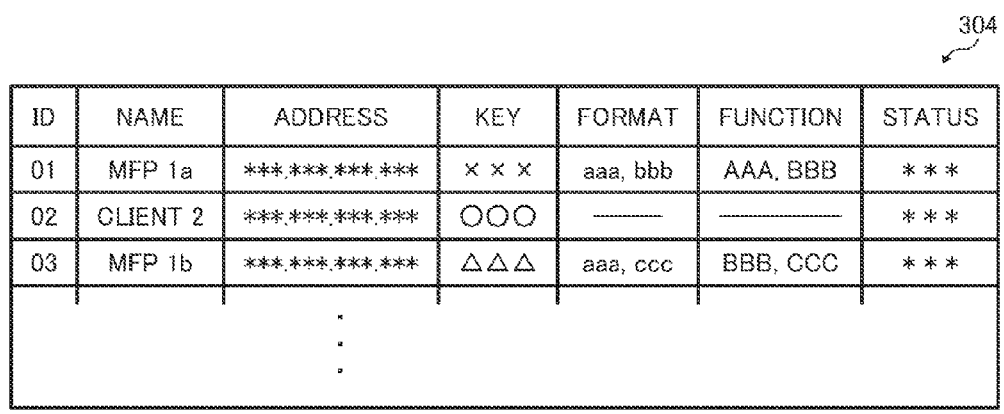
FIG. 19 is an illustration for explaining device information managed by the session management server shown in FIG. 18.

In such case, when the user connects to the network D through the information processing apparatus 2, the registrar 305 of the image processing management apparatus 6 may obtain device information from the image forming apparatus 1b, and store the device information in the device information DB 304 in a substantially similar manner as described above referring to FIG. 6. Specifically, in this example, as illustrated in FIG. 19, the device information DB 304 shown in FIG. 7 may be updated to have device information of the image forming apparatus 1b. Once the device information stored in the device information DB 304 is updated, the printer information that is stored in the printer information manager 253 of the printing controller 205 of the information processing apparatus 2 may be updated, for example, by downloading the device information regarding the image forming apparatus 1b. Based on the updated printer information, the UI manager 255 may update the screen to notify the user that the image forming apparatus 1b is available for use.

Alternatively, the printing controller 205 of the information processing apparatus 2 may obtain device information regarding the image forming apparatus 1b by sending a request, which requests the image processing management apparatus 6 to send device information regarding an image forming apparatus connected to a local area network to which the information processing apparatus 2 is currently connected. Such request may be sent using the SOAP. In response, the image processing management apparatus 6 may search for one or more image forming apparatuses connected to the network D by referring to the address information, such as the subnet section of the IP address, of the image forming apparatus 1.

In this manner, even when the user requests to print image data using the image forming apparatus 1b, which is not previously registered in the system, the information processing apparatus 2 is capable of generating an image processing request or an image forming request without installing a printer driver specific to the image forming apparatus 1b.

Further, in this example, even when the user is logged onto the system through an information processing apparatus other than the information processing apparatus 2, the user is able to use a service provided by the information processing apparatus 2.

In another example, the user may request through the information processing apparatus 2 connected to the network D to print image data using the image forming apparatus 1a connected to the network A. In another example, the user may request through the information processing apparatus 2 connected to the network A to print image data using the image forming apparatus 1b connected to the network D. From the user's perspective, the information processing apparatus 2 may function as a facsimile capable of sending the image data to any one of the image forming apparatuses 1 provided on the network N.

Figure 20:
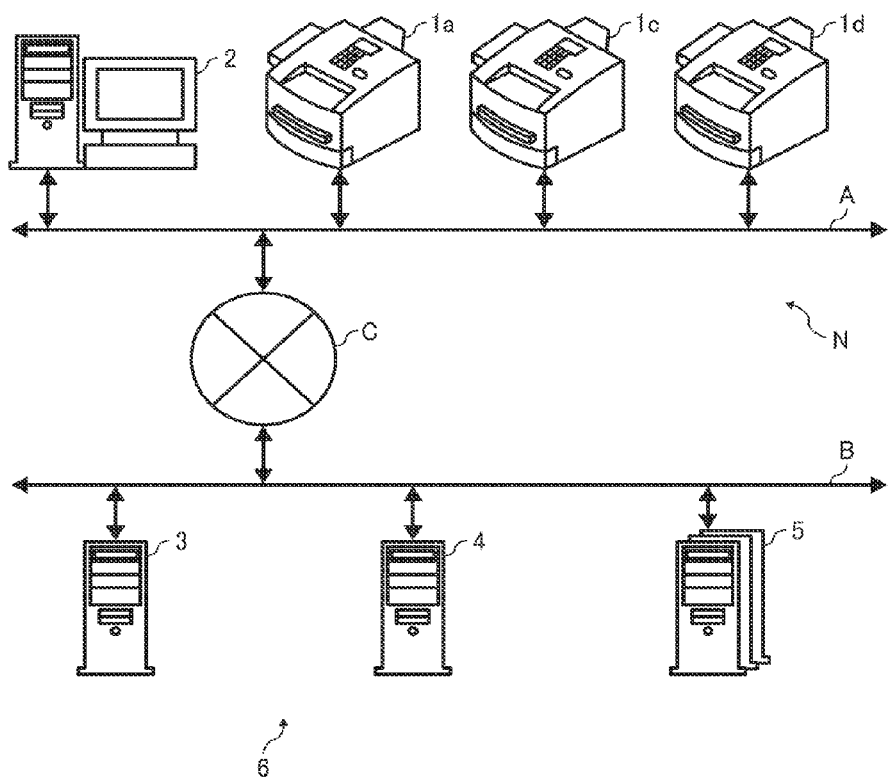
FIG. 20 is an illustration for explaining a configuration of an image processing system according to an example embodiment of the present invention.

Referring now to FIG. 20, a configuration of an image processing system is explained according to an example embodiment of the present invention. The image processing system of FIG. 20 is substantially similar to the image processing system of FIG. 1. The differences include the addition of a plurality of image forming apparatuses 1c and 1d, which are each connected to the network A. Specifically, in this example, the user at the information processing apparatus 2 may select one of the image forming apparatuses 1a, 1c, and 1d as an image forming apparatus 1 to perform image forming.

Even when the plurality of image forming apparatuses 1 are provided, operation of image processing or image forming may be performed in a substantially similar manner as described above referring to FIGS. 11 to 17, and 25 to 27. However, in the example case illustrated in FIG. 20, the user request generated by the information processing apparatus 2 may specify the selected one of the image forming apparatus 1a, 1c, and 1d as the image forming apparatus 1 to print the image data.

Figure 21:
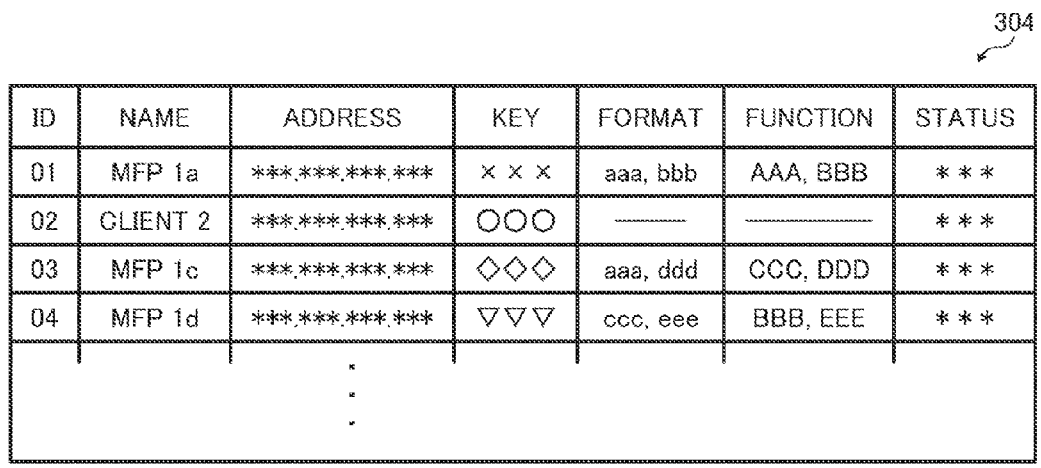
FIG. 21 is an illustration for explaining device information managed by the session management server shown in FIG. 20.

In such case, when the image forming apparatus 1c or 1d, which may be collectively referred to as the image forming apparatus 1, connects to the network A, the registrar 305 of the image processing management apparatus 6 may obtain device information from the image forming apparatus 1 in a substantially similar manner as described above referring to FIG. 6. Specifically, in this example, as illustrated in FIG. 21, the device information DB 304 shown in FIG. 7 may be updated to have device information of the image forming apparatuses 1c and 1d. Once the device information stored in the device information DB 304 is updated, the printer information that is stored in the printer information manager 253 of the printing controller 205 of the information processing apparatus 2 may be updated, for example, by downloading the device information regarding the image forming apparatuses 1*c* and 1*d*. Based on the updated printer information, the UI manager 255 may update the screen to notify the user that the image forming apparatuses 1*c* and 1*d* are available for use.

Alternatively, the printing controller 205 of the information processing apparatus 2 may obtain device information regarding the image forming apparatuses 1*c* and 1*d* by sending a request, which requests the image processing management apparatus 6 to send device information regarding an image forming apparatus connected to the network A. Such request may be sent using the SOAP. In response, the image processing management apparatus 6 may search for one or more image forming apparatuses connected to the network A by referring to the address information, such as the subnet section of the IP address, of the image forming apparatus 1.

In this manner, even when one or more image forming apparatuses are introduced to the network N, the information processing apparatus 2 is capable of generating an image processing request or an image forming request without installing a printer driver specific to the new image forming apparatus.

Referring now to FIGS. 21 to 24, image operation, image forming operation, and post processing operation, performed by the image processing system of FIG. 20, are explained according to an example embodiment of the present invention. In this example, the information processing apparatus 2 generates a user request according to a user instruction received through the user I/F 206. Specifically, in this example, it is assumed that the user request includes an image processing request that requests for specific image processing to be applied to image data to generate processed image data, an image forming request that instructs the image processing management apparatus 6 to output an image of the processed image data, and a post processing request that instructs the image processing management apparatus 6 to apply post processing to the recording sheet having the printed image thereon. In this example, the post processing request may include post processing information regarding post processing to be applied, such as stapling, punching, book-binding, folding, sorting, etc.

The structure of each apparatus provided on the image processing system of FIG. 20 is substantially similar to the structure of corresponding apparatus provided on the image processing system of FIG. 1. However, in this example, the device information DB 304 of the session management server 3 may additionally store post processing function information regarding a post processing function provided by the image forming apparatus 1 for each one of the image forming apparatuses 1*a*, 1*c*, and 1*d*.

Figure 22:
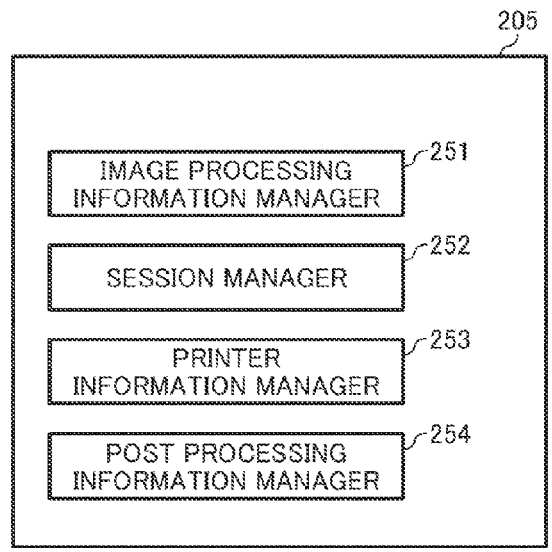
FIG. 22 is a schematic block diagram illustrating the functional structure of a printing controller of the information processing apparatus shown in FIG. 20.
Figure 23:
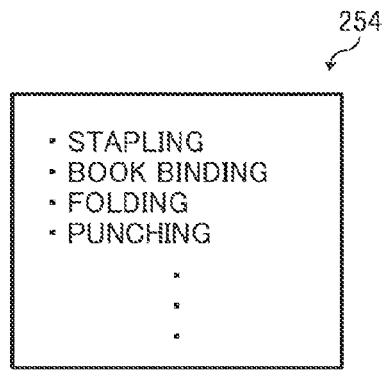
FIG. 23 is an illustration for explaining a post processing function managed by the printing controller shown in FIG. 22.

Further, in this example, the printing controller 205 of the information processing apparatus 2 may be additionally provided with a post processing information manager 254 as illustrated in FIG. 22. The post processing information manager 254 manages post processing function information, which indicates various post processing functions provided by the image processing system of FIG. 20. For example, as illustrated in FIG. 23, the post processing function information may include a plurality of post processing functions including stapling, book-binding, folding, punching, etc. The post processing function information may be downloaded from the image processing management apparatus 6 in a substantially similar manner as described above referring to the example case in which the image processing function information is obtained.

In operation, when the user request is received from the information processing apparatus 2, the image processing management apparatus 6 analyzes the user request to determine how image processing, image forming, and post processing should be performed by the image processing system of FIG. 20. Specifically, in this example, the image processing management apparatus 6 determines whether the data format of the image data is interpretable by any one of the image forming apparatus 1 to generate a determination result. Further, the image processing management apparatus 6 determines whether the specific image processing can be applied by any one of the image forming apparatus 1 to generate a determination result. Further, the image processing management apparatus 6 determines whether the specific post processing can be applied by any one of the image forming apparatus 1 to generate a determination result. Based on the determination result, the image processing management apparatus 6 may generate an instruction, which specifies how a plurality of apparatuses on the network N including the image forming apparatus 1 and the information processing apparatus 2 should operate to process the user request.

Figure 24:
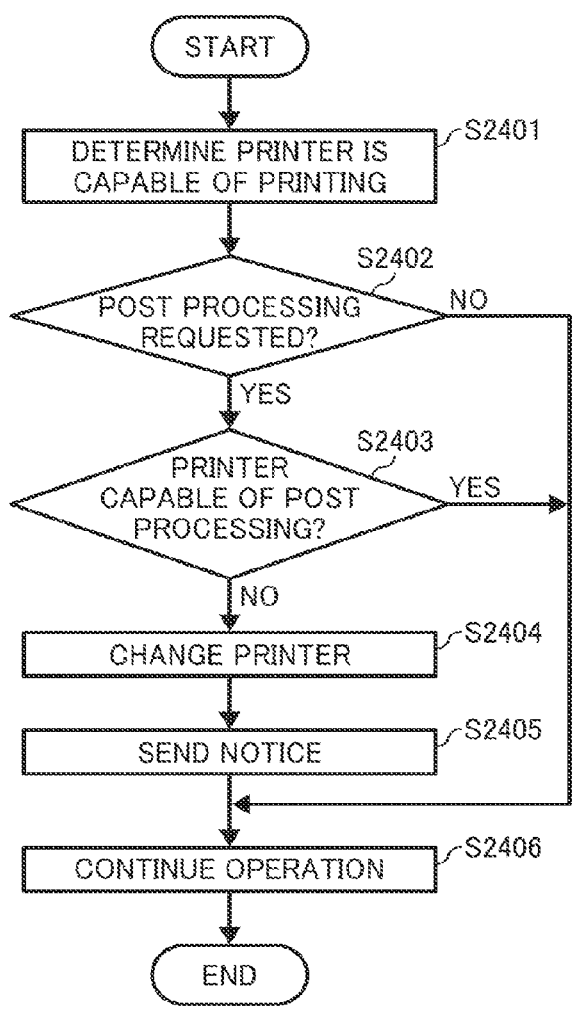
FIG. 24 is a flowchart illustrating operation of determining post processing operation, performed by the session management server shown in FIG. 20, according to an example embodiment of the present invention.

Referring now to FIG. 24, operation of determining whether the specific post processing can be applied by the image forming apparatus 1*a*, performed by the image processing management apparatus 6, is explained according to an example embodiment of the present invention. The operation of FIG. 24 may be performed after S1403 of FIG. 14 when the determination result at S1403 indicates that the image forming apparatus 1*a* is capable of performing image formation ("YES" at S1403), but before the operation proceeds to S1405 of obtaining information regarding the data format and the specific image processing. For the descriptive purpose, in this example, the user request specifies the image forming apparatus 1*a* as the printer to process the image forming request and the post processing request.

Referring to FIG. 24, at S2401, the session management server 3 determines that the image forming apparatus 1*a* is capable of performing image formation based on the determination result obtained at S1403 of FIG. 14.

At S2402, the service manager 306 analyzes the user request to determine whether the post processing information indicates that any post processing is requested by the user. When the post processing information indicates that no post processing is requested ("NO" at S2402), the operation proceeds to S2406 to end the operation of FIG. 24, and further proceeds to S1405 of FIG. 14. When the post processing information indicates that any post processing is requested ("YES" at S2402), the operation proceeds to S2403.

At S2403, the service manager 306 refers to the device information DB 304 to determine whether the image forming apparatus 1*a* specified by the printer information of the user request is capable of applying post processing specified by the post processing information of the user request. When the image forming apparatus 1*a* is not capable of applying the specific post processing ("NO" at S2403), the operation proceeds to S2404. When the image forming apparatus 1*a* is capable of applying the specific post processing ("YES" at S2403), the operation proceeds to S2406.

At S2404, the service manager 306 refers to the device information DB 304 to search for the image forming apparatus 1 capable of applying the specific post processing to generate a search result. Based on the search result, the service manager 306 may automatically change the printer processing the request from the image forming apparatus 1*a* to the searched one of the image forming apparatuses 1*c* and 1*d*.

At S2405, the session manager 302 sends a notice to the information processing apparatus 2, which notifies that the printer processing the request is changed from the image forming apparatus 1*a* to the searched one of the image forming apparatuses 1*c* and 1*d*, and the operation further proceeds to S2406.

As described above referring to FIG. 24, the user is capable of requesting specific post processing, even when the image forming apparatus 1a is not capable of applying such specific post processing. As long as at least one device that is capable of applying the specific post processing is provided on the network N, the user may request the specific post processing. Further, in such case, the user does not have to search for the image forming apparatus that is capable of applying the specific post processing.

Further, even when there is no image forming apparatus capable of applying post processing specified by the user, the system may be changed so as to provide such post processing function, for example, by adding the image forming apparatus capable of performing the requested post processing or a post processing device capable of performing the requested post processing to the network A where the user is located. In such case, the user does not have to change the settings of any apparatus provided on the network A.

The operation of FIG. 24 may be performed in various other ways. For example, when searching for the image forming apparatus 1 capable of applying specific post processing at S2404, the image processing management apparatus 6 may only search for the image forming apparatus 1, which is assumed to be located near the user, by comparing the address information of the information processing apparatus 2 that the user is currently logged on and the address information of the image forming apparatus 1c or 1d. Alternatively, the address information of the image forming apparatus 1a may be compared with the address information of the image forming apparatus 1c or 1d.

In another example, when the search result at S2404 indicates that more than one image forming apparatus 1 can apply specific post processing, the image processing management apparatus 6 may send the search result to the information processing apparatus 2 to request the user to select one of the image forming apparatuses 1. Alternatively, the image processing management apparatus 6 may select one of the image forming apparatus 1 based on the device information, such as the address information or the status information. Alternatively, the post processing manager 254 (FIG. 22) of the printing controller 205 of the information processing apparatus 2 may only download device information regarding the image forming apparatus 1 that is assumed to be located near the information processing apparatus 2. This may prevent the user to accidentally select the image forming apparatus 1 that is not located near the location of the user, while reducing the processing load of the image processing management apparatus 6.

In another example, when the search result at S2404 indicates that there is no image forming apparatus 1 capable of applying specific post processing, the image processing management apparatus 6 may send the search result to the information processing apparatus 2, preferably together with a message that requests the user to select whether to print without applying post processing or cancel the currently performed job. Based on the user selection, the image processing management apparatus 6 may instruct the apparatus on the network N to process the user request without applying post processing or to cancel the user request.

In another example, the post processing function information may be managed together with the image processing function information, preferably by the image processing information manager 251 (FIG. 4).

In another example, the post processing function information and the image processing function information may be classified differently. For example, the image forming apparatus 1 is provided with the hardware-related function, which is mainly performed by the hardware device. The hardware-related function includes, for example, double-sided printing, in addition to the post processing described above referring to FIG. 23. Further, sorting may be performed mainly by the software device of the image forming apparatus 1 such that sorting may be classified as the image processing function.

Figure 28:
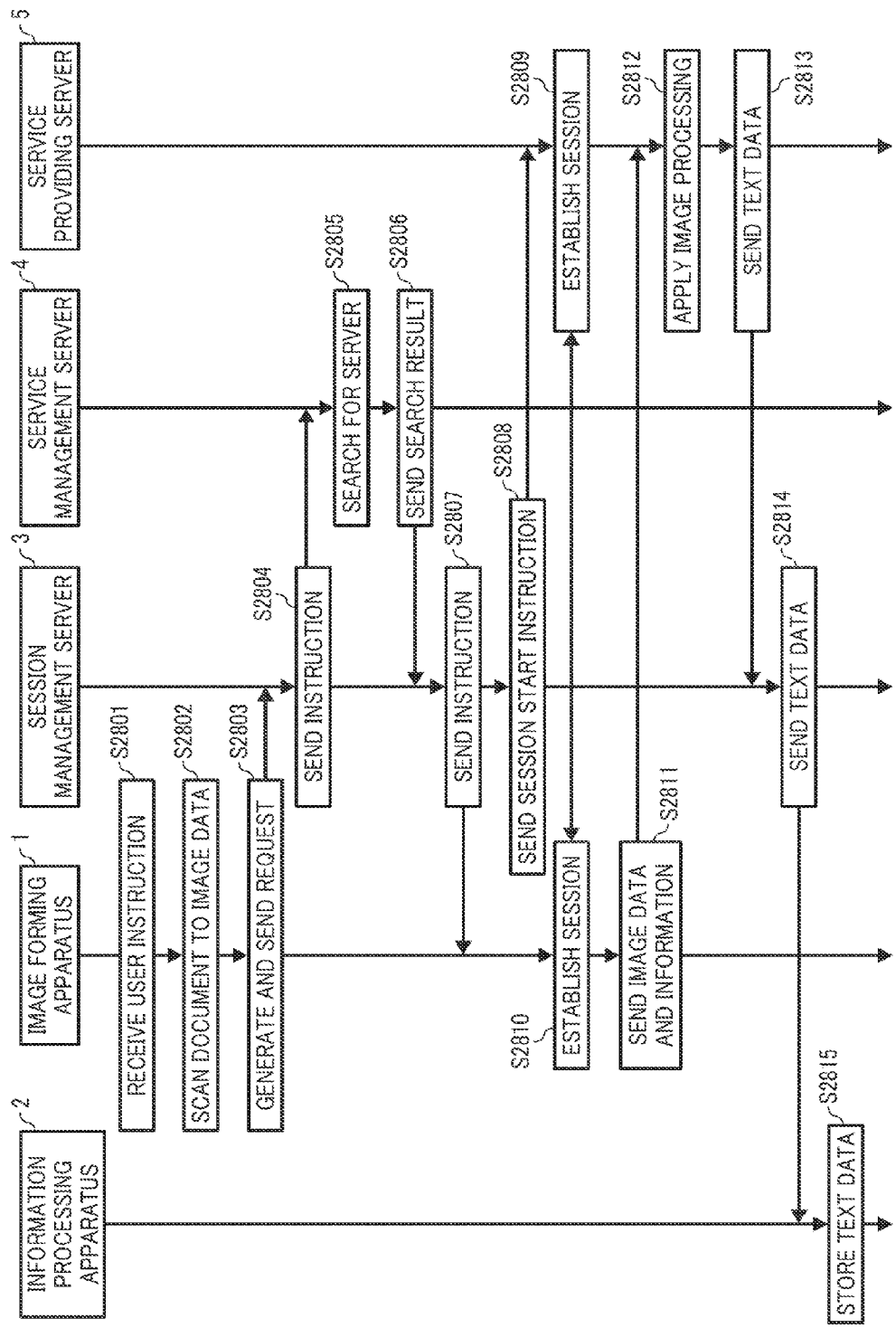
FIG. 28 is a data sequence diagram illustrating operation of processing a user request, according to an example embodiment of the present invention.

Referring now to FIG. 28, image scanning operation, image processing operation, and image transferring operation, performed by the image processing system of FIG. 1, are explained according to an example embodiment of the present invention. In this example, the image forming apparatus 1 generates a user request according to a user instruction received through the operation panel 104. Specifically, in this example, it is assumed that the user request includes an image scanning request that request for scanning an original document into image data, an image processing request that requests for specific image processing to be applied to the image data being obtained by scanning, and an image transfer request that instructs the image processing management apparatus 6 to transfer the processed image data to the information processing apparatus 2.

When the user request is received from the image forming apparatus 1, the image processing management apparatus 6 analyzes the user request to determine how image scanning, image processing and image transferring should be performed by the image processing system of FIG. 1.

At S2801, the image forming apparatus 1 receives a user instruction for scanning an original document into image data, applying optical character recognition (OCR) processing to the image data to generate text data, and sending the text data to the information processing apparatus 2.

At S2802, the image forming apparatus 1 scans the original document, which may be provided to the ADF 101 or the scanner 102, into the image data.

At S2803, the image forming apparatus 1 generates a user request based on the user instruction. The user request includes an image processing request for applying specific image processing, which is OCR processing, to the image data, and an image transferring request for sending the text data the information processing apparatus 2. The image forming apparatus 1 further sends the user request to the session management server 3.

When the user request is received, at S2804, the session management server 3 sends an instruction to the service management server 4. The instruction may request the service management server 4 to apply OCR processing.

When the instruction and the image data are received, at S2805, the service management server 4 searches through the service providing server 5 to find a device that is capable of applying OCR processing.

At S2806, the service management server 4 sends the search result obtained at S2805 to the session management server 3. The search result may include address information or authentication information of the device of the service providing server 5 that is capable of applying OCR processing.

When the search result is received, at S2807, the session management server 3 sends an instruction including the search result to the image forming apparatus 1.

At S2808, the session management server 3 sends a session start instruction to the device of the service providing server 5 being found to request starting of a session.

At S2809 and S2810, the service providing server 5 and the image forming apparatus 1 establish a session.

When the session is established, at S2811, the image forming apparatus 1 sends the image data and the image processing information to the service providing server 5.

At S2812, the service providing server 5 applies OSR processing to the image data to generate the text data.

At S2813, the service providing server 5 sends the text data to the session management server 3.

At S2814, the session management server 3 sends the text data to the information processing apparatus 2.

At S2815, the information processing apparatus 2 stores the text data into a memory specified by the user request, and the operation ends.

As described above referring to FIG. 28, the user is capable of requesting specific image processing through the image forming apparatus 1, even when neither one of the image forming apparatus 1 and the information processing apparatus 2 is capable of applying the specific image processing. As long as at least one device that is capable of applying the specific image processing is provided on the network N, the user may request the specific image processing.

The operation of FIG. 28 may be performed in various other ways. For example, at S2801, the user instruction may be input through any apparatus other than the image forming apparatus 1, such as the information processing apparatus 2.

In another example, the text data may be stored in a memory provided at any desired location on the network N or any desired removable memory.

In another example, the image data to be processed may be stored in any desired location on the network N. As long as data location information regarding the location where the image data is stored can be obtained, the service providing server 5 may download the image data from the location, for example, without obtaining directly from the image forming apparatus 1.

In another example, the image data to be processed may be sent to the session management server 3 together with the user request.

In another example, as described above referring to FIGS. 26 and 27, for example, the specific image processing may include a plurality of image processing operations that may be applied by more than one device of the service providing server 5. In such case, the processing order may be determined by the image processing management apparatus 6.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, an image processing management apparatus may include: a registrar to receive device information from a service providing apparatus provided on a network via the network, the device information including image processing function information regarding an image processing function provided by an image processing apparatus of the service providing apparatus; a session manager to receive an image processing request from a first apparatus provided on the network via the network, the image processing request being generated by the first apparatus according to a user instruction for applying image processing to input data to generate output data, the image processing request including image processing information regarding the image processing to be applied to the input data to generate the output data; and a service manager to determine whether the service providing apparatus is capable of applying the image processing specified by the image processing information by referring to the image processing function information to generate a first service determination result and to generate an image processing instruction when the first service determination result indicates that the service providing apparatus is capable of applying the image processing specified by the image processing information to cause the service providing apparatus to apply the image processing specified by the image processing information using the image processing function.

In another example, the image processing management further includes: a processing order manager configured to determine an order of applying a plurality of image processing operations of the image processing to generate a processing order determination result when the service providing apparatus includes a plurality of image processing apparatuses each applying at least one of the plurality of image processing operations of the image processing to cause the service providing apparatus to apply the plurality of image processing operations according to the order specified by the processing order determination result.

In another example, according to the above-described image processing management apparatus, the session manager may further receive an image transfer request from the first apparatus via the network, the image transfer request being generated by the first apparatus according to a user instruction for transferring the output data to a second apparatus provided on the network, and send a session start instruction to at least one of the first apparatus, the second apparatus, and the service providing apparatus via the network to cause at least two of the first apparatus, the second apparatus, the service providing apparatus, and the image processing management apparatus to establish a session, the output data being transferred to the second apparatus after the session is established.

In another example, according the above-described image processing management apparatus, when the service providing apparatus includes an image forming apparatus that provides an image forming function, the device information being received by the registrar further includes data format information regarding a data format interpretable by the image forming apparatus. The session manager may further receive an image forming request from the first apparatus via the network, with the image forming request being generated by the first apparatus according to a user instruction for forming an image of the output data generated from the input data. The service manager may further determine whether the image forming apparatus is capable of interpreting the data format of at least one of the input data and the output data by referring to the data format information to generate a second service determination result, and generate an image forming instruction when the second service determination result indicates that the image forming apparatus is capable of interpreting the data format of at least one of the input data and the output data.

In another example, according to the above-described image processing management apparatus, the service manager may further determine whether the image processing apparatus is capable of converting the data format of at least one of the input data and the output data to generate a third service determination result when the second service determination result indicates that the image forming apparatus is not capable of interpreting the data format. The session manager may further send an image processing instruction to the image processing apparatus via the network when the third service determination result indicates that the image processing apparatus is capable of converting the data format.

In another example, according to the above-described image processing management apparatus, the device information may further include post processing function information regarding a post processing function provided by the image forming apparatus. The image forming request may further include post processing information regarding post processing to be applied to a sheet having the image being formed thereon. The service manager may further determine whether the image forming apparatus is capable of applying post processing specified by the post processing information by referring to the post processing function information to generate a fourth service determination result, and generate a post processing instruction when the fourth service determination result indicates that the image forming apparatus is capable of applying the post processing to cause the image forming apparatus to apply the post processing.

In another example, according to the image processing management apparatus, the session manager may further send a notice via the network to the first apparatus when the fourth service determination result indicates that the image forming apparatus is not capable of applying the post processing.

In another example, the image processing management apparatus may further include: a storage to store user authentication information regarding a user of the image processing system; and an authentication manager to determine whether user authentication information being received by the register from the first apparatus matches the user authentication information being stored to generate an authentication determination result. The session manager may further accept the image processing request from the first apparatus when the authentication determination result indicates that the user authentication information being received matches the user authentication information being stored.

In another example, an information processing apparatus may include: a user interface to interact with a user; a session manager to receive image processing function information from an image processing management apparatus provided on a network via the network; an image processing information manager to manage the image processing function information received from the image processing management apparatus; and a user interface manager to generate a first screen including the image processing function information and to cause the user interface to display the first screen. The user interface may receive a user instruction from the user for applying image processing to input data to generate output data, being selected from the image processing function information included in the first screen.

In another example, according to the above-described information processing apparatus, when the image processing function information at the image processing management apparatus is updated, the session manager receives the updated image processing function information. The user interface manager further updates the screen to be displayed through the user interface from the first screen to a second screen, with the second screen including the updated image processing function information.

In another example, the above-described information processing apparatus may further include a network interface provided with a first port for signaling communication and a second port for data communication. When a session is established, for example, with another apparatus on the network according to a session start instruction received from the image processing management apparatus via the first port, the session manager may further open the second port to receive the output data from the outside apparatus via the second port.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing system, comprising:
a first apparatus provided on a network that generates a user request including (i) image processing information indicating image processing to be applied to image data to generate processed data, and (ii) device-specific information indicating an image forming apparatus to form an image of the processed data;
a service providing apparatus provided on the network, the service providing apparatus including one or more image processing apparatuses each providing one or more image processing functions; and
an image processing management apparatus provided on the network and disposed to communicate through the network with the first apparatus, the image forming apparatus, and the service providing apparatus, the image processing management apparatus including:
a memory that stores device information of the image forming apparatus and device information of the service providing apparatus,
the device information of the image forming apparatus including device-specific information of the image forming apparatus and image processing function information indicating one or more image processing functions that can be provided by the image forming apparatus,
the device information of the service providing apparatus including, for each one of the one or more image processing apparatuses of the service providing apparatus, device-specific information that specifies an image processing apparatus and image processing function information indicating one or more image processing functions that can be provided by the image processing apparatus;
a session manager that receives the user request from the first apparatus via the network; and
a service manager that refers to the device information of the image forming apparatus to extract the image processing function information of the image forming apparatus using the device-specific information of the user request, and determines whether the image forming apparatus indicated by the device-specific information of the user request is capable of applying the image processing specified by the image processing information of the user request by referring to the extracted image processing function information to generate a first service determination result, wherein
in a case that the first service determination result indicates that the image forming apparatus is capable of applying the image processing specified by the image processing information of the user request, the service manager generates an image processing instruction and sends the image processing instruction to the image forming apparatus via the session manager to cause the image forming apparatus to apply the image processing specified by the image processing information of the user request to generate the processed data, and in a case that the first service determination result indicates that the image forming apparatus is not capable of applying the image processing specified by the image processing information of the user request, the service manager searches the device information of the service providing apparatus to extract device-specific information that is stored in association with image processing function information indicating the image specified by the image information of the user request, specifies at least one image processing apparatus of the service providing apparatus that is capable of applying the image specified by the image information of the user request using the extracted device-specific information, and sends the at least one image processing apparatus of the service providing apparatus an image processing instruction to cause the at least one image processing apparatus to apply the image processing specified by the image processing information of the user request to generate the processed data and send the processed data to the session manager, and the session manager sends the received processed data together with an instruction to print the process data to the image forming apparatus indicated by the device-specific information of the user request.

2. The image processing system of claim 1, wherein the device information of the image forming apparatus further includes data format information indicating a data format interpretable by the image forming apparatus, the device information of the service providing apparatus further includes, for each one of the one or more image processing apparatuses of the service providing apparatus, data format information indicating a data format interpretable by the image processing apparatus, and the service manager of the image processing management apparatus further determines whether the image forming apparatus is capable of interpreting a data format of a processed data by referring to the data format information of the image forming apparatus to generate a second service determination result, and wherein in a case that the second service determination result indicates that the image forming apparatus is capable of interpreting the data format of the processed data, the service manager generates an image forming instruction and sends the image forming instruction via the session manager to the image forming apparatus to cause the image forming apparatus to form the image of the processed data, and in a case that the second service determination result indicates that the image forming apparatus is not capable of interpreting the data format of the processed data, the service manager refers to the data format information of the service providing apparatus to specify at least one image processing apparatus of the service providing apparatus that is capable of converting the data format of the processed data to a data format interpretable by the image forming apparatus, and sends the at least one image processing apparatus of the service providing apparatus a data conversion instruction to cause the at least one image processing apparatus of the service providing apparatus to apply data conversion to the processed data to have the data format interpretable by the image forming apparatus.

3. The image processing system of claim 2, wherein the image processing management apparatus further comprises:

a processing order manager that determines an order of applying a plurality of image processing operations of the image processing specified by the image processing information of the user request to generate a processing order determination result, and when the at least one image processing apparatus of the service providing apparatus includes a plurality of image processing apparatuses, the plurality of image processing apparatuses of the service providing apparatus applies the plurality of image processing operations according to the order specified by the processing order determination result.

4. The image processing system of claim 3, wherein the service manager of the image processing management apparatus further generates route information indicating a route of which the image data to be processed is transferred from one image processing apparatus to another image processing apparatus of the service providing apparatus based on the processing order determination result, and sends the route information together with the image processing instruction to a first image processing apparatus that is specified by the route information as the first age processing apparatus to firstly apply the image processing to the image data, and the first age processing apparatus applies the image processing to the image data, refers to the route information to specify a second image processing apparatus to secondly apply the image processing to the image data processed by the first image processing apparatus, and sends the image processing instruction, the processed image data, and the route information, respectively, to the second image processing apparatus.

5. The image processing system of claim 4, wherein the first image processing apparatus updates contents of the image processing instruction to be transmitted to the second image processing apparatus such that the image processing instruction indicates that the image processing to be applied by the first image processing apparatus is completed.

6. The image processing system of claim 2, wherein, in the case that the first service determination result indicates that the image forming apparatus is capable of applying the image processing specified by the image processing information of the user request and that the second service determination result indicates that the image forming apparatus is capable of interpreting the data format of the processed data, the session manager of the image processing management apparatus further sends a session start instruction to the image forming apparatus to cause the image forming apparatus to establish a session with the first apparatus, and further sends a data transfer instruction to the first apparatus to send the image data to be processed to the image forming apparatus, the image data being transferred from the first apparatus to the image forming apparatus through the session.

7. The image processing system of claim 6, wherein the device information of the image forming apparatus further includes supply information indicating whether the image forming apparatus has sufficient supply for image forming, and the service manager of the image processing management apparatus further determines whether the image forming apparatus is ready for forming the image of the processed data by referring to the supply information, the session start instruction being transmitted to the image forming apparatus when the supply information indicates that the image forming apparatus has sufficient supply.

8. The image processing system of claim 2, wherein, in the case that the first service determination result indicates that the image forming apparatus is not capable of applying the image processing specified by the image processing information of the user request, or in the case that the second service determination result indicates that the image forming apparatus is not capable of interpreting the data format of the processed data, the session manager of the image processing management apparatus further sends a session start instruction to the at least one image processing apparatus of the service providing apparatus to establish a session with the first apparatus, and further sends a data transfer instruction to the first apparatus to send the image data to be processed to the at least one image processing apparatus, the image data being transferred from the first apparatus to the at least one image processing apparatus through the session.

9. The image processing system of claim 8, wherein
the device information of the service providing apparatus further includes, for each one of the one or more image processing apparatuses of the service providing apparatus, device status information indicating a current status of the image processing apparatus, and
the service manager of the image processing management apparatus determines whether the at least one image processing apparatus of the service providing apparatus is ready for applying the image processing or the data conversion by referring to the device status information, and sends the session start instruction to the at least one image processing apparatus only when the device status information indicates that the at least one image processing apparatus is ready for applying the image processing.

10. The image processing system of claim 2, wherein
the service providing apparatus stores the processed data to which the image processing is applied in a storage provided on the network,
the service manager of the image processing management apparatus generates a data obtaining instruction, the data obtaining instruction including data location information regarding the location of the storage on the network, and
the session manager of the image processing management apparatus sends the data obtaining instruction to at least one of the first apparatus and the image forming apparatus to cause the at least one of the first apparatus and the image forming apparatus to obtain the processed data using the data location information.

11. The image processing system of claim 1, wherein the image processing management apparatus further includes: a registrar that receives the device information of the service providing apparatus and the device information of the image forming apparatus, respectively, via the network.

12. The image processing system of claim 11, wherein the first apparatus is an information processing apparatus including:
a user interface that interacts with a user;
a session manager that receives the image processing function information of the service providing apparatus and the image processing function information of the image forming apparatus, respectively, from the image processing management apparatus via the network;
an image processing information manager that manages the image processing function information received from the image processing management apparatus; and
a user interface manager that generates a screen indicating one or more image processing functions that can be provided by the image processing system based on the image processing function information for display to the user,
wherein the image processing specified by the image processing information of the user requests is selected by the user from the one or more image processing functions indicated by the screen.

13. An image processing management apparatus disposed to communicate through a network with a service providing apparatus and an image forming apparatus, the image processing management apparatus including:
a registrar that receives device information of the service providing apparatus and device information of the image forming apparatus, respectively, via the network;
a memory that stores the device information of the service providing apparatus and the device information of the image forming apparatus,
the device information of the image forming apparatus including device-specific information of the image forming apparatus and image processing function information indicating one or more image processing functions that can be provided by the image forming apparatus,
the device information of the service providing apparatus including, for each one of one or more image processing apparatuses of the service providing apparatus, device-specific information that specifies an image processing apparatus and image processing function information indicating one or more image processing functions that can be provided by the image processing apparatus;
a session manager that receives a user request from a first apparatus via the network, the user request including (i) image processing information indicating image processing to be applied to image data to generate processed data, and (ii) device-specific information indicating the image forming apparatus to form an image of the processed data;
a service manager that refers to the device information of the image forming apparatus to extract the image processing function information of the image forming apparatus using the device-specific information of the user request, and determines whether the image forming apparatus indicated by the device-specific information of the user request is capable of applying the image processing specified by the image processing information of the user request by referring to the extracted image processing function information to generate a first service determination result; and
a controller that controls operation of the image processing management apparatus, wherein
in a case that the first service determination result indicates that the image forming apparatus is capable of applying the image processing specified by the image processing information of the user request, the service manager generates an image processing instruction and sends the image processing instruction via the session manager to the image forming apparatus to cause the image forming apparatus to apply the image processing specified by the image processing information of the user request to generate the processed data, and
in a case that the first service determination result indicates that the image forming apparatus is not capable of applying the image processing specified by the image processing information of the user request, the service manager searches the device information of the service providing apparatus to extract device-specific information that is stored in association with image processing function information indicating the image specified by the image information of the user request, specifies at least one image processing apparatus of the service providing apparatus that is capable of applying the image specified by the image information of the user request using the extracted device-specific information, and sends the at least one image processing apparatus of a service providing apparatus an image processing instruction to cause the at least one image processing apparatus to apply the image processing specified by the image processing information of the user request to generate the processed data and send the processed data to the session manager, and the session manager sends the received processed data together with an instruction to print the processed data to the image forming apparatus indicated by the device-specific information of the user request.

14. The image processing management apparatus of claim 13, wherein the device information of the image forming apparatus further includes data format information indicating a data format interpretable by the image forming apparatus, the device information of the service providing apparatus further includes, for each one of the one or more image processing apparatuses of the service providing apparatus, data format information indicating a data format interpretable by the image processing apparatus, and the service manager further determines whether the image forming apparatus is capable of interpreting a data format of a processed data by referring to the data format information of the image forming apparatus to generate a second service determination result, and wherein in a case that the second service determination result indicates that the image forming apparatus is capable of interpreting the data format of the processed data, the service manager generates an image forming instruction and sends the image forming instruction via the session manager to the image forming apparatus to cause the image forming apparatus to form the image of the processed data, and in a case that the second service determination result indicates that the image forming apparatus is not capable of interpreting the data format of the processed data, the service manager refers to the data format information of the service providing apparatus to specify at least one image processing apparatus of the service providing apparatus that is capable of converting the data format of the processed data to a data format interpretable by the image forming apparatus, and sends the at least one image processing apparatus of the service providing apparatus a data conversion instruction to cause the at least one image processing apparatus of the service providing apparatus to apply data conversion to the processed data to have the data format interpretable by the image forming apparatus.

15. The image processing management apparatus of claim 14, further comprising:

a processing order manager that determines an order of applying a plurality of image processing operations of the image processing specified by the image processing information of the user request to generate a processing order determination result, wherein when the at least one image processing apparatus of the service providing apparatus includes a plurality of image processing apparatuses, the plurality of age processing apparatuses of the service providing apparatus applies the plurality of image processing operations according to the order specified by the processing order determination result.

16. A method performed by an image processing management apparatus to manage an image processing system including a service providing apparatus and an image forming apparatus respectively connected through a network to the image processing management apparatus, the method comprising:

receiving device information of the service providing apparatus and device information of the image forming apparatus, respectively, via the network, the device information of the image forming apparatus including device-specific information of the image forming apparatus and image processing function information indicating one or more image processing functions that can be provided by the image forming apparatus, the device information of the service providing apparatus including, for each one of one or more image processing apparatuses of the service providing apparatus, device-specific information that specifies an image processing apparatus and image processing function information indicating one or more image processing functions that can be provided by the image processing apparatus;

receiving a user request from the first apparatus via the network, the user request including (i) image processing information indicating image processing to be applied to image-data to generate processed data, and (ii) device-specific information indicating the image forming apparatus to form an image of the processed data;

extracting the image processing function information of the image forming apparatus using the device-specific information of the user request, from the device information of the image forming apparatus; and determining whether the image forming apparatus indicated by the device-specific information of the user request is capable of applying the image processing specified by the image processing information of the user request by referring to the extracted image processing function information to generate a first service determination result, wherein in a case that the first service determination result indicates that the image forming apparatus is capable of applying the image processing specified by the image processing information of the user request, generating an image processing instruction and sending the image processing instruction to the image forming apparatus to cause the image forming apparatus to apply the image processing specified by the image processing information of the user request to generate the processed data, and in a case that the first service determination result indicates that the image forming apparatus is not capable of applying the image processing specified by the image processing information of the user request, the service manager searches the device information of the service providing apparatus to extract device-specific information that is stored in association with image processing function information indicating the image specified by the image information of the user request, specifics at least one image processing apparatus of the service providing apparatus that is capable of applying the age specified by the image information of the user request using the extracted device-specific information, and sends the at least one image processing apparatus of the service providing apparatus an image processing instruction to cause the at least one image processing apparatus to apply the image processing specified by the image processing information of the user request to generate the processed data and send the process data to a session manager, and the session manager sends the received processed data together with an instruction to print the process data to the image forming apparatus indicated by the device-specific information of the user request.

17. The method of claim 16, further comprising:
receiving data format information indicating a data format interpretable by the image forming apparatus as a part of the device information of the image forming apparatus;
receiving, for each one of the one or more image processing apparatuses of the service providing apparatus, data format information indicating a data format interpretable by the image processing apparatus, as a part of the device information of the service providing apparatus; and
determining whether the image forming apparatus is capable of interpreting the data format of the processed data by referring to the data format information of the image forming apparatus to generate a second service determination result, wherein
in a case that the second service determination result indicates that the image forming apparatus is capable of interpreting a data format of a processed data, generating an image forming instruction and sending the image forming instruction to the image forming apparatus to cause the image forming apparatus to form the image of the processed data, and
in a case that the second service determination result indicates that the image forming apparatus is not capable of interpreting the data format of the processed data, specifying at least one image processing apparatus of the service providing apparatus that is capable of converting the data format of the processed data to a data format interpretable by the image forming apparatus by referring to the data format information of the service providing apparatus, and sending the at least one image processing apparatus of the service providing apparatus a data conversion instruction to cause the at least one image processing apparatus of the service providing apparatus to apply data conversion to the processed data to have the data format interpretable by the image forming apparatus.

18. The method of claim 17, further comprising:
determining an order of applying a plurality of image processing operations of the image processing specified by the image processing information of the user request to generate a processing order determination result,
wherein when the at least one image processing apparatus of the service providing apparatus includes a plurality of image processing apparatuses, causing the plurality of image processing apparatuses of the service providing apparatus to apply the plurality of image processing operations according to the order specified by the processing order determination result.

\* \* \* \* \*